(12) United States Patent
Petersen et al.

(10) Patent No.: US 9,576,243 B2
(45) Date of Patent: *Feb. 21, 2017

(54) ADVANCED INTELLIGENCE ENGINE

(71) Applicant: LogRhythm, Inc., Boulder, CO (US)

(72) Inventors: Chris Petersen, Boulder, CO (US);
Phillip Villella, Boulder, CO (US);
Brad Aisa, Lafayette, CO (US)

(73) Assignee: LogRhythm, Inc., Boulder, CO (US)

( * ) Notice: Subject to any disclaimer, the term of this patent is extended or adjusted under 35 U.S.C. 154(b) by 642 days.

This patent is subject to a terminal disclaimer.

(21) Appl. No.: 14/026,834

(22) Filed: Sep. 13, 2013

(65) Prior Publication Data
US 2014/0012796 A1  Jan. 9, 2014

Related U.S. Application Data

(63) Continuation of application No. 13/303,526, filed on Nov. 23, 2011, now Pat. No. 8,543,694.

(60) Provisional application No. 61/417,114, filed on Nov. 24, 2010.

(51) Int. Cl.
| | |
|---|---|
| *H04L 29/06* | (2006.01) |
| *G06N 5/02* | (2006.01) |
| *H04L 12/24* | (2006.01) |
| *G06F 21/55* | (2013.01) |
| *H04L 12/26* | (2006.01) |

(52) U.S. Cl.
CPC .............. *G06N 5/025* (2013.01); *H04L 41/069* (2013.01); *H04L 63/1425* (2013.01); *G06F 21/552* (2013.01); *H04L 43/04* (2013.01); *H04L 43/16* (2013.01); *H04L 63/1416* (2013.01)

(58) Field of Classification Search
CPC ...... G06F 21/552; H04L 41/06; H04L 41/069; H04L 63/1416; H04L 63/1425
See application file for complete search history.

(56) References Cited

U.S. PATENT DOCUMENTS

| | | | |
|---|---|---|---|
| 5,197,116 A | * | 3/1993 | Katoh ................. G06N 99/005 706/48 |
| 5,857,190 A | | 1/1999 | Brown |
| 6,073,255 A | | 6/2000 | Nouri et al. |
| 6,327,677 B1 | | 12/2001 | Garg et al. |
| 6,718,489 B1 | | 4/2004 | Lee et al. |
| 7,003,560 B1 | | 2/2006 | Mullen |
| 7,143,442 B2 | | 11/2006 | Scarfe |
| 7,152,242 B2 | | 12/2006 | Douglas |
| 7,155,514 B1 | | 12/2006 | Milford |
| 7,376,969 B1 | | 5/2008 | Njemanze et al. |
| 7,383,463 B2 | | 6/2008 | Hayden et al. |

(Continued)

*Primary Examiner* — Jeong S Park
(74) *Attorney, Agent, or Firm* — Marsh Fischmann & Breyfogle LLP; Jonathon A. Szumny

(57) ABSTRACT

An advanced intelligence engine (AIE) for use in identifying what may be complex events or developments on one or more data platforms or networks from various types of structured or normalized data generated by one or more disparate data sources. The AIE may conduct one or more types of quantitative, correlative, behavioral and corroborative analyses to detect events from what may otherwise be considered unimportant or non-relevant information spanning one or more time periods. Events generated by the AIE may be passed to an event manager to determine whether further action is required such as reporting, remediation, and the like.

19 Claims, 25 Drawing Sheets

(56) References Cited

U.S. PATENT DOCUMENTS

| | | |
|---|---|---|
| 7,461,044 B2 | 12/2008 | Slahshour et al. |
| 7,548,848 B1 | 6/2009 | Deb et al. |
| 7,600,160 B1 | 10/2009 | Lovy et al. |
| 7,609,625 B2 | 10/2009 | Wei |
| 7,653,633 B2 * | 1/2010 | Villella ............... G06F 11/3476 370/386 |
| 7,673,335 B1 * | 3/2010 | Chakravarty ......... G06F 21/552 726/11 |
| 7,685,627 B2 | 3/2010 | Joubert et al. |
| 7,743,029 B2 | 6/2010 | Frey et al. |
| 8,135,610 B1 * | 3/2012 | Bryce ............. G06Q 10/06395 705/7.41 |
| 8,156,553 B1 | 4/2012 | Church |
| 8,543,694 B2 * | 9/2013 | Petersen ............... H04L 41/069 709/224 |
| 8,739,290 B1 | 5/2014 | Jamail |
| 2002/0042846 A1 | 4/2002 | Bottan et al. |
| 2002/0073167 A1 | 6/2002 | Powell et al. |
| 2002/0120886 A1 | 8/2002 | Nguyen et al. |
| 2002/0138762 A1 | 9/2002 | Horne |
| 2002/0165902 A1 | 11/2002 | Robb et al. |
| 2002/0165959 A1 | 11/2002 | Urano et al. |
| 2003/0005082 A1 | 1/2003 | Shah et al. |
| 2003/0120663 A1 | 6/2003 | Vining et al. |
| 2003/0212789 A1 | 11/2003 | Hamel et al. |
| 2003/0212899 A1 | 11/2003 | Curtis |
| 2003/0235190 A1 | 12/2003 | Josyula et al. |
| 2004/0028059 A1 | 2/2004 | Josyula et al. |
| 2004/0039809 A1 | 2/2004 | Ranous et al. |
| 2004/0039827 A1 | 2/2004 | Thomas et al. |
| 2004/0128586 A1 | 7/2004 | Bahr et al. |
| 2004/0153407 A1 | 8/2004 | Clubb et al. |
| 2004/0153509 A1 | 8/2004 | Alcorn et al. |
| 2004/0194114 A1 | 9/2004 | Spiegel |
| 2004/0254919 A1 | 12/2004 | Giuseppini |
| 2005/0021701 A1 | 1/2005 | Seki et al. |
| 2005/0038888 A1 | 2/2005 | Labertz |
| 2005/0049924 A1 | 3/2005 | DeBettencourt et al. |
| 2005/0114321 A1 | 5/2005 | DeStefano et al. |
| 2005/0114508 A1 | 5/2005 | DeStefano |
| 2005/0114708 A1 | 5/2005 | DeStefano et al. |
| 2005/0198111 A1 | 9/2005 | Lamb et al. |
| 2006/0037075 A1 | 2/2006 | Frattura et al. |
| 2006/0112175 A1 | 5/2006 | Sellers et al. |
| 2006/0161816 A1 | 7/2006 | Gula et al. |
| 2006/0184529 A1 | 8/2006 | Berg et al. |
| 2007/0050777 A1 | 3/2007 | Hutchinson et al. |
| 2007/0261112 A1 | 11/2007 | Todd |
| 2008/0195636 A1 * | 8/2008 | Chand ................. H04L 12/2602 |
| 2009/0265288 A1 * | 10/2009 | Chakravarty .......... G06N 5/022 706/11 |
| 2011/0119279 A1 | 5/2011 | Wacker |
| 2011/0119374 A1 * | 5/2011 | Ruhl ................... G06F 17/3089 709/224 |

* cited by examiner

AI ENGINE RULE BLOCK WIZARD - LOG OBSERVED

PRIMARY CRITERIA FILTERS
CREATE FILTERS THAT IDENTIFY EVENTS TO CONSIDER FOR ALARMING. ALL PRIMARY CRITERIA FILTERS MUST BE MET IN ORDER FOR AN EVENT TO BE CONSIDERED. AT LEAST ONE PRIMARY CRITERIA FILTER MUST BE SPECIFIED.

⊕ NEW  ✎ EDIT  ⊗ DELETE

| FIELDS FILTERED ON | RECORD TYPE |
|---|---|
| ▲ CLASSIFICATION | CUSTOM |

MINIMUM RISK BASED PRIORITY
SPECIFY THE MINIMUM PRIORITY AN EVENT MUST HAVE TO BE CONSIDERED FOR ALARMING.
EVENT PRIORITY MUST BE GREATER THAN: [ 0 ]

PRIMARY CRITERIA | INCLUDE FILTERS | EXCLUDE FILTERS | DAY AND TIME CRITERIA | LOG SOURCE CRITERIA | GROUP BY INFORMATION

< BACK | NEXT >     OK  CANCEL

AI ENGINE RULE BLOCK WIZARD - LOG OBSERVED

GROUP BY FIELDS

GROUP LOGS WITH IDENTICAL VALUES IN THE FOLLOWING FIELDS

- ☐ ACCOUNT
- ☑ CLASSIFICATION
- ☐ COMMON EVENT
- ☐ COUNTRY (IMPACTED)
- ☐ COUNTRY (ORIGIN)
- ☐ DIRECTION
- ☐ DOMAIN
- ☐ ENTITY (IMPACTED)
- ☐ ENTITY (ORIGIN)
- ☐ GROUP
- ☐ HOSTNAME (IMPACTED)
- ☐ HOSTNAME (ORIGIN)
- ☐ IMPACTED APPLICATION
- ☐ IMPACTED HOST
- ☐ IMPACTED KNOWN APPLICATION
- ☐ IP ADDRESS (IMPACTED)
- ☐ IP ADDRESS (ORIGIN)
- ☐ KNOWN HOST (IMPACTED)
- ☐ KNOWN HOST (ORIGIN)
- ☐ LOCATION (IMPACTED)
- ☐ LOCATION (ORIGIN)
- ☐ LOG SOURCE
- ☐ LOG SOURCE ENTITY
- ☐ LOG SOURCE HOST
- ☐ MPE RULE
- ☐ NETWORK (IMPACTED)
- ☐ NETWORK (ORIGIN)
- ☐ OBJECT
- ☐ ORIGIN HOST
- ☐ ORIGIN LOGIN
- ☐ PROCESS
- ☐ PROTOCOL
- ☐ RECIPIENT
- ☐ REGION (IMPACTED)
- ☐ REGION (ORIGIN)
- ☐ SENDER
- ☐ SESSION
- ☐ SUBJECT
- ☐ TCP/UDP PORT (IMPACTED)
- ☐ TCP/UDP PORT (ORIGIN)
- ☐ URL
- ☐ VENDOR MESSAGE ID
- ☐ ZONE (IMPACTED)
- ☐ ZONE (ORIGIN)

PRIMARY CRITERIA | INCLUDE FILTERS | EXCLUDE FILTERS | DAY AND TIME CRITERIA | LOG SOURCE CRITERIA | GROUP BY INFORMATION

< BACK | NEXT >    OK | CANCEL

AI ENGINE RULE BLOCK WIZARD - UNIQUE VALUES OBSERVED

UNIQUE VALUES
THE RULE BLOCK WILL DETECT WHEN MORE THAN THE SPECIFIED NUMBER UNIQUE OCCURRENCES ARE OBSERVED.

FIELD: [HOSTNAME (IMPACTED) ▼]
OCCURRENCES: [5]

TIME LIMIT
THE OCCURRENCES MUST BE OBSERVED WITHIN [0] HRS. [1] MINS. [0] SECS.

[PRIMARY CRITERIA] [INCLUDE FILTERS] [EXCLUDE FILTERS] [DAY AND TIME CRITERIA] [LOG SOURCE CRITERIA] [GROUP BY] [UNIQUE VALUES] [INFORMATION]

[< BACK] [NEXT >]   [OK] [CANCEL]

FIG. 16

AI ENGINE RULE BLOCK WIZARD - LOG NOT OBSERVED SCHEDULED

EVALUATION SCHEDULE

SPECIFY THE MONITORING INTERVALS WHEN THE RULE BLOCK WILL BE EVALUATED.

○ ALWAYS ACTIVE  ● ACCORDING TO THE SCHEDULE BELOW

TIME ZONE: [UTC] COORDINATED UNIVERSAL TIME

☑ ADJUST FOR DAYLIGHT SAVINGS TIME

| START DAY | START TIME | END DAY | END TIME |
|---|---|---|---|
| ▶ MONDAY | 8:00 AM | MONDAY | 5:59 PM |
| TUESDAY | 8:00 AM | TUESDAY | 5:59 PM |
| WEDNESDAY | 8:00 AM | WEDNESDAY | 5:59 PM |
| THURSDAY | 8:00 AM | THURSDAY | 5:59 PM |
| FRIDAY | 8:00 AM | FRIDAY | 5:59 PM |
| * | | | |

ADD    DELETE

EVALUATION FREQUENCY

THE RULE BLOCK WILL BE EVALUATED AT THE BEGINNING OF EACH MONITORING INTERVAL AND PERIODICALLY THEREAFTER. AN EVENT WILL BE GENERATED IF THE CONDITIONS ARE NOT OBSERVED WITHIN THE PRIOR EVALUATION FREQUENCY AMOUNT OF TIME.

EVERY [0] HRS. [10] MINS.

PRIMARY CRITERIA | INCLUDE FILTERS | EXCLUDE FILTERS | DAY AND TIME CRITERIA | LOG SOURCE CRITERIA | TIME LIMIT | SCHEDULE | DISTINCT INFORMATION

< BACK    NEXT >          OK    CANCEL

AI ENGINE RULE BLOCK 3 RELATIONSHIP

RELATED FIELDS
SPECIFY THE FIELDS WHICH RELATE THIS RULE BLOCK TO THE PRECEDING ONE.
ONLY GROUP BY FIELDS CAN BE USED IN RELATIONSHIPS.

| RULE BLOCK 2 GROUP BY FIELD | OPERATOR | RULE BLOCK 3 GROUP BY FIELD |
|---|---|---|
| CLASSIFICATION | = | CLASSIFICATION |
| * | | |

ADD    DELETE

TIME LIMIT
THE RULE BLOCK MUST BE SATISFIED WITHIN  [1] HRS.  [30] MINS.  [0] SECS. ~712
BEGIN EVALUATING THE CURRENT RULE BLOCK  [0:33:20]  BEFORE THE PREVIOUS RULE BLOCK IS SATISFIED. ~716

OK    CANCEL

FIG. 21

| LOG SOURCE | LOG MESSAGE | CLASSIFICATION |
|---|---|---|
| LOGRHYTHM AI E.. | <aie v="1"><_0 DHost="1\|0\|199.106.52.160\|116\|" NormalMsgDateLower="2011-11-17 15:20:00" NormalMsgDateUpper="2011-11-17 15:20:00" NormalMsgDateLower="2011-11-17 16:40:00" RuleBlockType="1"/><_1 DHost="1\|0\|116\|sd_utm1" NormalMsgDate="2011-11-17 16:20:00" NormalMsgDateLower="2011-11-17 16:20:00" NormalMsgDateUpper="2011-11-17 16:20:00" NormalMsgDateUpper="2011-11-17 16:40:00"RuleBlockType="1"/><_AIERuleID="15" DateEdited="2011-07-12 17:08:47"/></aie> | DENIAL OF SERVICE |

ADVANCED INTELLIGENCE ENGINE

CROSS-REFERENCE TO RELATED APPLICATIONS

This application is a continuation of U.S. patent application Ser. No. 13/303,526 entitled "ADVANCED INTELLIGENCE ENGINE" as filed on Nov. 23, 2011, which claims the benefit of U.S. Provisional Application No. 61/417,114 entitled "ADVANCED INTELLIGENCE ENGINE" as filed on Nov. 24, 2010, the entire contents of which are hereby incorporated within by reference.

FIELD OF THE INVENTION

The present invention relates in general to network monitoring and information management that allows for event detection and analysis based on the processing and organization of log messages and other types of structured or normalized data.

BACKGROUND

Modern business operations typically require many communication devices and technologies that include routers, firewalls, switches, file servers, ERP applications, etc. Generally, such devices and technologies report their health and status by writing log files. For example, computer processors are responsible for processing vast amounts of data for a variety of applications. To determine how a certain application may be processed by a computer processor, engineers typically design the application with a log file that records various functional outputs within the application. That is, certain functions within the application may output data to the log file so that the engineers may diagnose problems (e.g., software bugs) and/or observe general operational characteristics of the application.

By observing the general operational characteristics of an application, certain valuable information may also be ascertained. For example, log files generated by a file server may record logins. In this regard, certain logins may be unauthorized and their prevention desired. However, with the multitude of communication devices and their corresponding applications available, a bewildering array of log data may be generated within a communication network. Additionally, communication networks are often upgraded with additional systems that provide even more logs. Adding to the complexity of the situation, communication devices and applications of these communication networks vary in many ways and so do their corresponding log file formats.

Attempts have been made by network and enterprise administrators to extract or identify useful information from the large volume of log messages generated by the aforementioned communication devices and technologies via one or more types of Security Event Management (SEM) solutions. Some of these attempts involve processing logs against one or more rules in an attempt to identify "events" that may be further analyzed by administrators and troubleshooters. Events may be any occurrence (as identified by one or more log messages) that may be of interest to a network administrator for further analysis. Examples include one or more particular IP address attempting to access a particular network device, a large quantity of data leaving the network, etc. For instance, upon at least a portion of a log message matching a rule, one or more particular actions may take place (e.g., archiving of the log message, alerting an administrator of the occurrence of the event, etc.).

SUMMARY OF THE INVENTION

The inventors have determined that traditional SEM solutions have a number of fundamental failings when it comes to detecting sophisticated intrusions, insider threats, and the like. In one regard, these traditional SEM solutions are often limited to logs that are already designated as "events." For instance, some traditional SEM solutions depend upon a monitored device pre-filtering log messages for allegedly important logs messages and then passing such messages to a processing engine implementing the traditional SEM solutions. Traditional SEM solutions have not been architected or designed to collect and analyze all log data regardless of source. Stated differently, these solutions have generally been designed with a limited scope in mind which has inherently limited their current and future analysis capabilities.

In another regard, traditional SEMs have confined themselves to the once thought "holy grail" of security—"correlation" (i.e., processing log messages against rules defining a known pattern of activity, where that pattern of activity may span multiple log messages from different devices). While correlation has at times proved useful, only things well known and understood can be correlated (e.g., knowing any attempted access of a network by a particular IP address is always cause for concern); thus, correlation is often limited based on analysis scope and complexity. Furthermore, each of researching, understanding, and developing these pattern-based rules is inherently complex which further limits overall usefulness.

With these shortcomings of traditional SEM solutions in mind, the inventors have determined that systems, apparatuses, processes, methods, etc. ("utilities") are needed that can collect and analyze most or all log or other types of structured or normalized data (e.g., transactional, activity, etc.) spread across multiple systems, devices, applications and databases and spanning any number of time periods by leveraging a combination of analysis techniques that independently offer value but, when combined, deliver a fundamental breakthrough in the detection of sophisticated intrusions and computer crime. Stated differently, utilities are needed that can, for instance, receive, process and extract what may otherwise be considered unimportant or non-relevant information from disparate data sources, but, when considered together (even over disparate time periods), may indicate a particular event or even an alarm that can be further analyzed and/or addressed by appropriate personnel.

Imagine the situation where a device originating from an external internet protocol (IP) address is launching an attack on a particular network by attempting to disrupt, deny, degrade, or destroy information resident on the network. For instance, the external device could attempt to send a code or instruction to a central processing unit (CPU) of a server within the particular network for causing the server to begin propagating malware throughout the network. A traditional SEM solution could detect the above event by, inter alia, utilizing any appropriate log processing rule(s) specifically designed to isolate log messages that originate from the external IP address (assuming the external IP address is known). In response to detecting that the external IP address is attempting a network attack, the log processing rule may be designed to send a message to a network administrator indicative of the attack.

However, what if the message to the network administrator indicative of the attack is never sent? As further examples, what if a backup of a network server or device started but never finished, or what if a server was attacked and later started transferring large amounts of data out of the network? Traditional SEM solutions have not been designed to automatically and seamlessly detect interesting instances or observations (or non-observations) that are linked or related to one or more other occurrences (e.g., such as the above network attack) and that are indicative of, for instance, a transfer of a large amount of data out of a network in a particular time period after a network device was contacted by an external IP address, a failure to send a message to a network administrator indicative of an attack, a failure to properly complete a backup of a network server, and the like.

As will be discussed herein, the present utilities serve to provide a single platform that allows administrators, troubleshooters, and other users to perform various types of analyses of structured data (e.g., log, transactional, activity) such as correlative, behavioral, statistical, corroborative, and the like. More specifically, the present utilities can be customized (e.g., in conjunction with a console or user interface) to dynamically detect a wide range of various combinations of network and other occurrences, such as the above example, in a manner that eliminates or limits the weaknesses in traditional notions of structured data-monitoring and detection (e.g., such as event correlation). Among other abilities, the present utilities can process a significant volume of structured or normalized data spread across multiple systems and devices in a memory and CPU efficient manner and irrespective of a time in which data is processed to extract or glean numerous types of useful information from the processed data (e.g., detecting sophisticated intrusions following known patterns and insider threats that may be effectively "invisible" to the organization). The analyses may be performed in real time to identify suspicious activity and known issues as they occur by providing a scalable solution that is capable of indexing and analyzing significant quantities of structured data and providing various analysis technique such as correlative analyses (e.g., generating an event if events a, b or c are observed followed by event d in timeframe z), statistical analyses (e.g., creating an event if data sent exceeds quantity a in timeframe z), behavioral analyses (e.g., creating an event if a user is observed authenticating to a network during timeframes that are significantly different than previously established usage patterns) corroborative analyses (e.g., creating an event if an attack is observed against a system known to be vulnerable to a), and the like.

Generally, the present utilities make use of one or more "rule blocks" or "rule modules," each of which is operable to obtain and store one or more types of "facts" (e.g., log related or other types of structured data), determine whether one or more "conditions" related to the facts have been satisfied (e.g., the observation or non-observation of particular types of facts, exceeding or not exceeding a threshold volume of transferred data, and/or the like), and take one or more types of actions upon satisfaction of the one or more conditions. One or more rule blocks can make up a log processing, structured data, or "Advanced Intelligence Engine" (AIE) rule. One or more "linking relationships" can connect adjacent rule blocks, each of which generally describes how one rule block is related to an adjacent rule block (e.g., a destination IP address in a first rule block is equal to a source IP address in a second rule block). Upon satisfaction of the condition(s) of one rule block (e.g., upon "triggering" or "firing" of a rule block) of an AIE rule (sometimes regardless of an order of the rule block relative to other rule blocks in the AIE rule), each of the one or more other rule blocks of the AIE rule is automatically evaluated by way of the various linking relationships to determine if its conditions has also been satisfied. When the conditions of all of the one or more rule blocks of an AIE rule have been satisfied, an "event" is generated that is indicative of satisfaction of all the rule blocks and which may be stored for use by personnel or the like.

For instance, a network administrator may be interested in knowing about any large data transfers that occur from a internal network device to an external IP address in a 30 minute period after the external IP address has accessed the internal network device, as such a combination of occurrences may indicate that a hacker has accessed the network and begun obtaining sensitive data from the network. In this regard, the administrator may design a first rule block that is configured to obtain, store and/or track all log messages generated by internal network devices as a function of time, and monitor for any connections between an external IP address and an internal IP address (e.g., where the first rule block's condition would be satisfied upon observing such a connection). For instance, upon the first rule block determining that a newly received log message includes an external source IP address and an internal destination IP address, the first rule block may "fire" or otherwise consider that its condition has been satisfied. That is, firing of the rule block upon or after an evaluation may be considered a first or desired/interesting outcome while non-firing of the rule block upon or after an evaluation may be considered a second or non-desired/non-interesting outcome.

The administrator may also design a second rule block that is configured to obtain, store and/or track log messages indicative of all outbound data transfers as a function of time, and monitor for any outbound data transfer from an internal device that is at least 1 GB in size. As part of creating an AIE rule, the administrator may then configure at least one linking relationship between the first and second rule blocks. The linking relationship may specify the particular data field content that is to be used, upon firing of one rule block, as a key into an index structure associated with the data of the other rule block. The linking relationship may also specify the temporal relationship between when adjacent rule block conditions must have been satisfied in order for an event to be generated. For instance, the administrator may equate the destination IP address field content of the first rule block to the source IP address field content of the second rule block. The administrator may also specify that an event is to be generated only if the second rule block's condition was satisfied within 30 minutes after the connection between the external and internal IP address was made (wherein the specific time of the connection may be different than the specific time at which the first rule block was or is satisfied, due to processing delays and the like).

To illustrate, imagine that upon evaluation of the first rule block (which may occur according to a predetermined schedule and/or upon a new piece of data being received by the first rule block), it is determined that an external/internal connection has occurred and thus that the first rule block's condition has been satisfied. Thereafter, the second rule block may be evaluated to determine if its condition has been satisfied in the 30 minutes after the external/internal connection occurred by using the specific destination IP address of the connection as a key into an index structure of data of the second rule block (where the source IP address of any over 1 GB outbound data transfer matches the specific destination IP address of the connection); an event may be generated upon a positive determination while no event may be generated upon a negative determination.

It may also be the case that the second rule block fires before the first rule block fires. For instance, upon determination that an outbound data transfer of 2 GB has occurred from an internal device (e.g., which may be indicated by one or possibly multiple log messages) and thus that the second rule block's condition has been satisfied, the first rule block may then be evaluated to determine whether its condition has been satisfied. In this situation, the specific source IP address of the internal device associated with the 2 GB outbound data transfer would then be used as a key into an index structure of data of the first rule block to determine if an external/internal connection occurred within the 30 minutes preceding the 2 GB outbound data transfer (where the destination/internal IP address of the connection matches the specific source IP address of the internal device associated with the 2 GB outbound data transfer); an event may be generated upon a positive determination while no event may be generated upon a negative determination.

The situation where facts indicative of a large outbound data transfer by an internal device are processed before facts indicative of an external connection to the internal device that precipitated the large outbound data transfer highlights how the present utilities can accommodate "out of time order" data processing while maintaining successful and/or efficient evaluation of an AIE rule. That is, regardless of the particular order in which log messages are processed, any temporal conditions linking adjacent rule blocks (e.g., the 30 minute interval in the above example) may be measured in relation to real-time or in other words according to the time the incident (e.g., the external/internal connection or the outbound data transfer) actually occurred (e.g., as measured by any appropriate log message time stamp) as opposed to when the rule block was evaluated or when data was processed.

The present utilities may also be used as part of a behavioral and/or relational analysis of structured or normalized facts. For instance, a first rule block could be designed to continually filter for or otherwise obtain one or more particular types of facts (e.g., all log data from a particular source, all log data having a particular classification, and/or the like). Also, a second rule block could be designed to make one or more determinations relating to the facts obtained by the first rule block (i.e., instead of the second rule block making determinations about facts that the second rule block obtains as discussed above). In one arrangement, administrators could set up a first plurality of rule blocks designed to obtain various types of facts, and a second plurality of rule blocks designed to ask various respective questions or otherwise make various respective determinations about whether specific types of facts exist, whether a threshold count related to the facts has been reached (e.g., equal to or over x number of bytes, equal to or over x log count, etc.), and the like. For instance, administrators can "mix and match" various one of the first plurality of rule blocks to various ones of the second plurality of rule blocks to allow for customization of various types of analyses to obtain various events of interest.

The present utilities may also encompass various techniques to identify what may be considered "false alarms." More specifically, while an AIE rule including first and second (and/or additional) rule blocks may appear to identify an event that typically would be considered "interesting" to an administrator or other personnel, the specific facts giving rise to the "event" may be subjected to additional processing that may effectively cause the non-generation of an event. For instance, imagine that an AIE rule includes a first rule block that fires when an external/internal connection is made, a second rule block that fires when an internal IP address transfers large amounts of data to the external address after the connection, and a linking relationship object that equates the particular impacted IP address of the first rule block with the particular origin IP address of the second rule block. While this AIE rule may have been designed to identify a hacker accessing data of a network, it may falsely identify a legitimate employee accessing the network from his or her home computer.

In one arrangement, the false alarm mitigation techniques disclosed herein may subject the facts collected by the rule blocks to various additional questions or queries that would tend to corroborate whether or not an event has actually been identified. For instance, if the particular IP address identified above was typically associated with large data transfers after hours, an event may thus not be generated for this particular scenario. In further embodiments, a plurality of additional questions or queries may be asked or made of the facts, where a positive answer to at least some of the questions or queries may effectively cancel out the generation of an event.

In another arrangement, the false alarm mitigation techniques may incorporate various types of closed-loop or fine-tuning schemes that allow the utilities to dynamically adjust various parameters based on historical results. For instance, while a particular AIE rule could include a rule block that is designed to fire when a particular threshold number of a quantitative value of a field (e.g., log count, bytes transferred) has been reached, the threshold number could dynamically adjust upwardly or downwardly based on historical results. In one embodiment, "indirect" administrator input may cause a threshold to move up or down, such as a threshold dynamically moving upwardly when an administrator continually indicates that an "event" generated from an AIE rule including a rule block with a particular threshold is not really an event. As another example, while one rule block could be designed to detect whether a "server backup completion" message has been generated in the 3 hours after another rule block has fired (e.g., design to detect whether a server backup start message has been generated), it may be the case that the average time that previous such server backup completion messages fire is only 1 hour after the server backup start message has been generated. Thus, the above 3 hour time period may dynamically adjust downwardly as appropriate.

According to one aspect, a utility for use in monitoring one or more platforms of one or more data systems, includes receiving, at a processing engine, structured data generated by one or more platforms over at least one communications network; first evaluating, at the processing engine using a first rule block (RB), at least some of the data; first determining, from the first evaluating, whether a result is one of at least first and second outcomes; and depending upon the determining, second evaluating, at the processing engine using a second RB, at least some of the data; and second determining, from the second evaluating, whether a result is one of at least first and second outcomes, where the results are analyzed to determine an event of interest.

In one arrangement, the first determining includes ascertaining that the result of the first evaluating is the first outcome. For instance, the first outcome may be that a "condition" of the rule block has been satisfied (e.g., a potentially "interesting" occurrence such as a server backup has started, an unusual outside IP address attempting to connect with a local machine, etc.) and the second outcome may be an "uninteresting" occurrence (e.g., a known employee logs into his or her work email server during business hours).

In any case, the method may further include ascertaining that the result of the second evaluating is the first outcome (i.e., the first outcome of the second rule block), and then generating an event after the result of the second evaluating is determined to be the first outcome. The second rule block could be designed to monitor for an occurrence that is at least somewhat related to the occurrence being monitored in the first rule block. For instance, the second rule block may be designed to monitor for a failure to receive a "server backup completion" message within a particular period of time corresponding to the specific IP address of the server associated with the server backup process, and the first outcome may be that no such completion message was received. In connection with generation of an event, an alarm may be generated which may be forwarded to any desired entities (e.g., administrators) to allow appropriate remedial action to be taken.

The first outcome of the first evaluating may occur at a first time that is identified by at least one time stamp of the at least some of the data (i.e., the data considered and evaluated by the first rule block). That is, the time at which the "condition" of the first rule block (and other rule blocks) is considered "satisfied" may be measured by the specific time stamp(s) of the data that gave rise to the satisfaction of the condition (i.e., instead of the specific time at which the rule block determined that its condition was satisfied). In some embodiments, the second evaluating may include considering data of the at least some of the data that is associated with at least one time stamp including a second time that is the same as or after the first time (i.e., of the first rule block), or even before the first time.

Each of the first and second evaluating steps may include making some determination about one or more fields of the at least some of the data, and a content of one of the fields in the first evaluating matches a content of one of the fields in the second evaluating. Stated differently, there may be at least one matching piece of content in the data evaluated by the first and second rule blocks (e.g., such as a common IP address). For instance, upon the first evaluating resulting in the first outcome (e.g., a determination that the first rule block's condition has been satisfied), the matching or common piece of content may be used as a key into an index structure of the at least some of the data (e.g., an index structure of an in-memory data structure maintained by the second rule block) to determine if the result is one of the first and second outcomes (e.g., to determine if the second rule block's condition has been satisfied, and thus whether an event should possibly be generated).

In one arrangement, the first outcome of at least one of the first and second evaluating includes data of the at least some of the data matching or not matching first criteria. For instance, the first criteria may include a particular content of one or more fields of the data of the at least some of the data. As another example, the first outcome may include a particular quantitative value (e.g., log count, bytes transferred, etc.) of the data matching the first criteria being equal to or exceeding a threshold for the particular quantitative value. As a further example, the first outcome may further include a particular field of the data comprising at least a threshold number of unique contents of the particular field. The particular time period may be measured in relation to a time at which the first outcome of one of the first and second evaluating occurred.

In some arrangements, further rule blocks could be processed at least partially in conjunction with the first and second rule blocks. For instance, in the case where the result of each of the first and second evaluating includes the first outcomes, the method could further include third evaluating, at the processing engine using a third rule block, at least some of the data, where the results are analyzed to determine an event of interest.

In one arrangement, the first and/or second evaluating may include aggregating the data of at least one common field of the data received at the processing engine, determining a total count of the aggregated data, and utilizing the total count in determining whether or not the result of the first and/or second evaluating includes the first condition or second condition. This arrangement advantageously allows for the efficient management of what may be large volumes of structured data. In another arrangement, additional (e.g., identical) events messages may be suppressed during a suppression window (e.g., for 30 minutes after an initial event). Any of the rule blocks may be configured to continually receive updated data and reevaluate the data in any appropriate manner (e.g., when new data is received, according to a predefined schedule, etc.).

According to another aspect, an event generating utility includes an event module that is adapted to be operatively interposed between a user console for manipulating the event module and at least one source of structured data, and an event processing engine that is logically connected between the at least one source of structured data and the event module for generating events from the at least one source of structured data. The event module includes a user rule module including a plurality of objects for use in allowing a user to define a user version of at least one structured data or fact processing rule, and an event table for storing generated events. The event processing engine includes a receiving module for receiving data related to the at least one source of structured data, a compiling module for obtaining the plurality of objects from the user rule module and generating a processing version of the at least one facts processing rule, and a processing module for evaluating the received data using the processing version of the at least one fact processing rule and, in response to the received data matching the processing version of the at least one fact processing rule, writing at least one event to the event table.

In one arrangement, the event module may include an alarming module for evaluating generated events in the event table using one or more alarm rules. In this arrangement, the alarming module may be operable to generate a notification message for transmission to one or more entities in response to a generated event matching an alarm rule. In another arrangement, the event generating system may include at least one structured data manager operatively interposed between the event processing engine and the at least one data source. For instance, the structured data manager may be operable to parse structured data received from the at least one data source, process the parsed structured data, and forward matching structured data to the receiving module of the event processing engine for further analysis.

In one embodiment, the at least one fact processing rule may include first and second rule blocks (RBs), where the received data matches the processing version of the at least one fact processing rule upon a first evaluation of the received data by the processing module using the first RB being a first of at least first and second first RB outcomes and a second evaluation of the received data by the processing module using the second RB being a first of at least first and second second RB outcomes. For instance, the processing module may proceed to determine whether the other of the first and second evaluations is the other of the first RB first outcome and second RB first outcome in response to the first or second evaluations by the processing module comprising one of the first RB first outcome and second RB first outcome.

In one arrangement, the processing module ceases determination of whether the other of the first and second evaluations is the other of the first RB first outcome and second RB first outcome upon expiration of a predetermined time period. For example, the predetermined time period may be measured from a determination that the first or second outcome is the one of the first RB first outcome and second RB second outcome. In another arrangement, the first RB first outcome includes the received data matching one or more particular criteria and the second RB first outcome includes the received data comprising one or more quantitative fields having a value exceeding a particular threshold value.

The structured or normalized data processed by the utilities disclosed herein may be generated in any appropriate manner and by numerous types of devices. For instance, log messages and/or other data may be generated by a variety of network platforms including, for instance, Windows servers, Linux servers, UNIX servers, routers, switches, firewalls, intrusion detection systems, databases, ERP applications, CRM applications, and homegrown applications. The log data can be collected using standard network logging and messaging protocols, such as, for instance, Syslog, SNMP, SMTP and other proprietary and non-proprietary protocols. Moreover, the log file may be text based, a proprietary format, a binary format, etc. In addition, the logs may be written to databases such as Oracle, Sybase, MySQL, etc. As a result, a data system may generate a large number of logs in different formats, and it may be desired to monitor or analyze these logs for a variety of purposes. Fields of information within such log messages can be identified and the messages can be selectively processed in accordance with rules based on those fields. In this manner, enhanced processing of textual messages including log messages may be achieved along with improved audit and compliance analysis, application monitoring, security monitoring, and operations analysis. Moreover, large networks may be supported and growing networks may be adapted to.

It should be appreciated that the various aspects discussed herein may be implemented via any appropriate number and/or type of platforms, modules, processors, memory, etc., each of which may be embodied in hardware, software, firmware, middleware, and the like.

BRIEF DESCRIPTION OF THE DRAWINGS

FIGS. 8-24 illustrate various screenshots of user interfaces that may be manipulated by a user during the creation and modification of one or more AIE rules made up of one or more rule blocks which may be utilized by the AIEs, event managers, etc. disclosed herein to obtain useful information from structured data such as processed logs.

DETAILED DESCRIPTION

The present disclosure relates to computer network monitoring and information management through the processing of various types of structured or normalized data generated by or gleaned from devices, hosts or networks. The utilities disclosed herein are applicable to a broad variety of applications such as providing event detection for virtually any type of system that generates data (e.g., computer servers, mainframes, network devices, security devices, access control devices, etc.). While much of the present discussion will be in relation to log messages and other log-related data, it should be appreciated that the present utilities are applicable to numerous other types of structured or normalized data (e.g., forensic data, transactional data, activity data, and/or the like).

Figure 1:
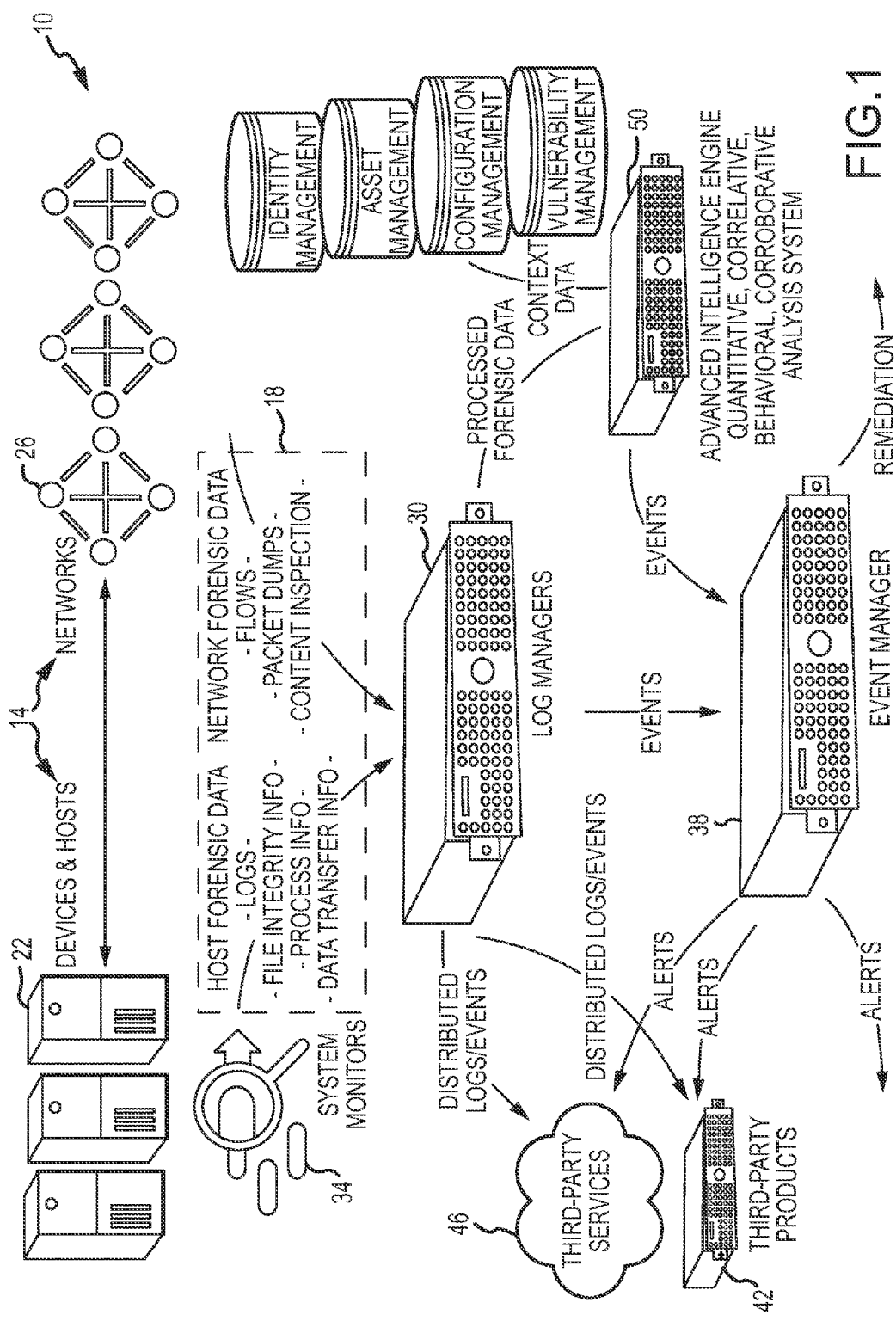
FIG. 1 is a block diagram of a system that provides for management of structured data generated by one or more data platforms and events associated therewith.

Turning to FIG. 1, a system 10 is provided that generally provides for the collection, processing, management, and analysis of various types of data generated by or gleaned from one or more devices, networks, processes, and the like. As shown, the system 10 may includes one or more root data sources 14 responsible for generating one or more types of data 18 that may be analyzed in numerous manners to extract meaningful information as will be discussed herein. The root data sources 14 may be represented by hosts or devices 22 (e.g., computers, servers, routers, switches) and networks 26 (although numerous other forms of root data sources 14 are also envisioned), and may each generate a plurality of text files describing various occurrences or developments associated with the operations of the root data source 14. The generated text files may also be routinely updated by the root data sources 14 as various events transpire during the root data sources' 14 operations, a process that may be referred to as "logging." Additionally, while text files are often used for logging because of their readily manageable format and because a person can more easily understand the information contained therein for diagnostic purposes when problems arise, data such as log messages may come in other formats as well.

The root data sources 14 that generate the data 18 may come in a variety of configurations, with each being capable of generating a tremendous amount of data 18 such as log messages. For example, one of the devices 22 may be a computer (e.g., server, desktop, notebook, laptop, computer workstation, mainframe system) that is operable within a computer network configuration. In this regard, the computer may be responsible for delivering applications to other devices 22 or processes within the computer network, administering communications among computers within the computer network, controlling various features of the computer network, and the like. In the process of performing these functions, although partially dependent upon the number of computers within the network, the computer may generate thousands, millions, etc. of log entries per day. To illustrate, when a user incorrectly attempts to logon to a single computer on the computer network, the computer may generate a log entry noting a particular time (e.g., timestamp) that an improper procedure was performed. Other examples of occurrences or developments that may cause the generation of log messages include, inter alia, application launch failures, audit activity, attacks, operating system errors, and the like.

While the data 18 may be in the form of log messages or entries generated by or gleaned from root data sources 14, the data 18 may take numerous other forms as well. For instance, the data 18 generated by devices 22 may be in the form of host forensic data such as file integrity information, process information, data transfer information, and the like. As an additional example, the data 18 generated by networks 26 may be in the form of dataflows (i.e., recalculated values for dependent variables that depend on one or more changing independent variables), packet dumps, content inspection, and the like.

The system 10 of the present disclosure provides for the rapid/automated extraction of viable information from the data 18. One component or aspect of the system 10 that facilitates this purpose is at least one log or structured data manager 30 (e.g., a plurality of log managers 30) communicatively coupled (via any appropriate wired or wireless network(s)) to the various root data sources 14 to receive the data 18 generated therefrom (e.g., collection). In this regard, the log manager 30 may use various protocols (e.g., syslog protocols, Netflow protocols) to communicate with the root data sources 14. In one arrangement, the system 10 may employ agents or system monitors 34 (e.g., software) that can operate on the individual root data sources 14 to extract data entries from registers or records of the root data sources 14. In some instances, the system monitors 34 are software protocols that are innate to the operating system of a root data source 14.

The information that the log manager 30 may extract from the logs may ultimately be used to generate alarm messages that may be useful to an end user. For example, the log manager 30 may process thousands of log messages and detect certain occurrences from the volume of data contained therein by way of processing the received log messages against one or more rules. The log manager 30 may aggregate log data into a manageable format that summarizes, for example, the frequency of a particular event. Additionally, the log manager 30 may archive the above data for future reporting uses. This aggregation and archival may generally be referred to as management.

For instance, upon determining that a particular IP address attempting to access one of the devices 22 or networks 26, the log manager 30 may generate at least one event that may be passed or transferred to an event manager 38 to determine whether one or more alarms should be generated (e.g., by processing the events against any appropriate alarm rule(s)). For instance, if the particular IP is that of a computer that routinely communicates to one of the networks 26 as part of an authorized process, the event may simply be registered by the event manager for future use, if any. However, if the IP address belongs to a computer system that is, for example, attempting to bombard the network with message traffic, the event manager 38 may generate an alarm that a denial of service attack is underway so that a system administrator may take appropriate steps to limit or prevent any damage. Additionally, the trends of events and/or alarm generation may be detected and reports pertaining to those trends may be provided. The various log managers 30 and event managers 38 may transmit logs, events, alarms, alerts and/or other data to one or more third-party products 42 by way of any appropriate third-party services 46. Representative examples of log managers 30, system monitors 34, event managers 38, and the like that may be used in conjunction with the system 10 may be found in U.S. Pat. No. 7,653,633 and U.S. Patent Application No. 61/360,815, the entire disclosure of each being hereby incorporated herein by reference.

With continued reference to FIG. 1, the system 10 may include at least one advanced intelligence engine (AIE) 50 that is broadly operable to analyze and process numerous types of structured or normalized data (e.g., data 18 which may be received directly from the data sources 14; data which has been processed by one or more log managers 30; data related to identity, asset, configuration and vulnerability management, etc.) using one or more log processing, structured data, or AIE rules to detect what may be complex events/conditions/developments/etc. occurring in relation to the data sources 14 while not being limited to use of traditional notions of "correlation". Part of the analyses performed by the AIE 50 may involve conducting one or more types of quantitative, correlative, behavioral and corroborative analyses to detect events from one or more disparate data sources, even when the data would otherwise be considered unimportant or non-relevant. Events generated by the AIE 50 may be passed to the event manager 38 which to determine whether further action is required such as reporting, remediation, and the like.

Figure 2:
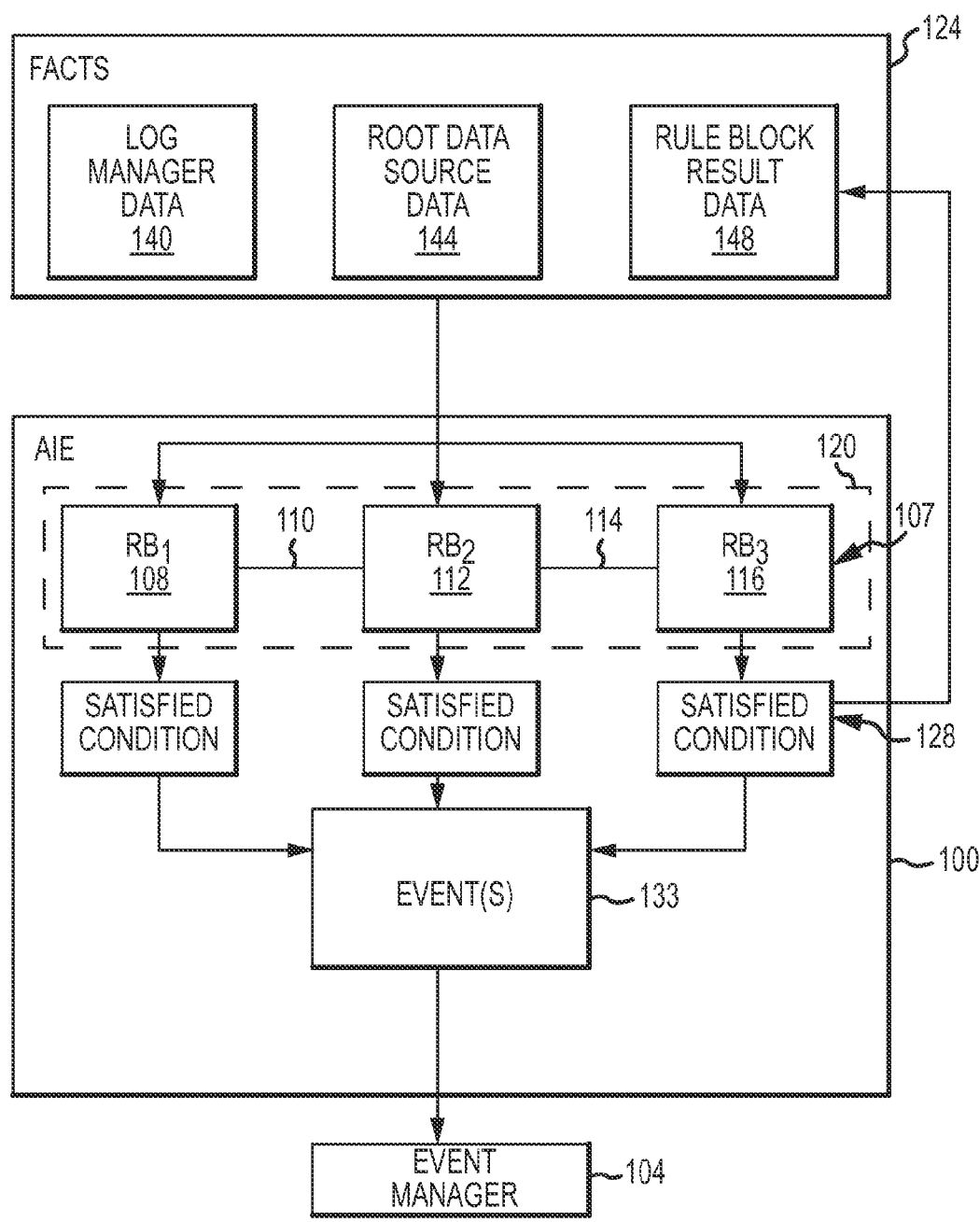
FIG. 2 is a block diagram illustrating a more detailed view of an advanced intelligence engine (AIE) usable with the system of FIG. 1, and illustrates data flow and processing occurring among fact sources, the AIE, and an event manager.

Turning to FIG. 2, a schematic block diagram of an AIE 100 (e.g., AIE 50 of FIG. 1) is presented that illustrates one or more types of processing and data flows that occur as part of analyzing structured or normalized data collected from numerous sources (which may be disparate) to generate events that may be further processed by an event manager 104 (e.g., event manager 38 of FIG. 1). As will be described in more detail later in this discussion, the AIE 100 (as well as the various other components, modules, processes and the like) may be implemented by any appropriate computer-readable code or logic stored on any appropriate computer-readable medium (e.g., RAM) and that is executed by any appropriate processor(s) or controller(s).

The AIE 100 may include one or more AIE rules, where each AIE rule is made up of one or more of what will be referred to as "rule blocks" (RB) 107. Each RB 107 may include any combination of logic, processes, and the like that is generally operable to obtain and store one or more types of possibly pre-filtered "facts" (e.g., structured data such as log-related data), determine whether one or more "conditions" related to the facts have been satisfied (e.g., the observation or non-observation of particular types of facts, exceeding or not exceeding a threshold volume of transferred data, and/or the like), and take one or more types of actions upon satisfaction of the one or more conditions (e.g., causing the evaluation of another RB 107 of an associated AIE rule, generating an event if the RB 107 is the only RB 107 of the AIE rule, generating an event if the conditions of all other RBs 107 of an associated AIE rule have already been satisfied, etc.). The AIE 100 may process numerous types of facts 124 generated by one or more platforms of one or more data systems, only some of which will be described herein.

One of the types of facts 107 may be data received from one or more log or structured data managers 140 (e.g., log manager 30 in FIG. 1). For example, and as described herein and in U.S. Pat. No. 7,653,633 and U.S. Patent Application No. 61/360,815 which have been incorporated herein by reference, log managers may process log messages received from root data sources (e.g., root data sources 14 in FIG. 1) and other data against any appropriate rule base made up of any appropriate expression syntax and/or tagging notation. Upon a log message matching a rule, various processing may be performed by the log manager such as determining log message direction (e.g., external, internal), calculating a risk-based priority, parsing meta-data from the log message text, and writing any of the above along with the original log message text to a database of the log manager. Thus, various log managers may perform at least some filtering of log messages and other data that is to be used by the AIE 100.

Another type of fact 124 may be root data source data 144 (e.g., data streamed directly from root data sources 18 in FIG. 1 or via one or more log managers). Root data source data 144 may be at least substantial similar to the original data generated by the root data sources 18. In one arrangement, each piece of root data source data 144 (e.g., each log message) may be a subset of parsed metadata contained in the log message. Another type of fact 124 may rule block result data 148. Rule block result data 148 may be any type of data generated by one or more of the RBs 107 (e.g., metadata corresponding to satisfied conditions 128). For instance, a satisfied condition object 128 from one RB 107 may be "fed into" another RB 107 as a fact 124 for that RB 107. This arrangement may be useful when, for instance, one RB 107 is to be triggered for processing in response to a satisfied condition object 128 generated by another RB 107. Numerous other types of facts 124 for use in the AIE 100 are envisioned such as time stamped occurrence of some kind, such as a LogRhythm Log record; a dynamic aggregate being maintained, such as recent Bytes sent for a user and host; static reference information, such as the location and other attributes of a Known Host, or the security permissions of a User; a timer-generated Fact to mark the start or end of a rule-based period; and the like. It should be appreciated that any appropriate protocol(s) may be used during communications between the AIE 100 and the various types of facts 124.

When an AIE rule is made up of at least two RBs 107, the RBs 107 of each adjacent pair of RBs 107 may be linked or connected by at least one "linking relationship" or "RB relationship" for reasons that will become more apparent in the ensuing discussion. With continued reference to the representative AIE 100 of FIG. 2, an AIE rule 120 includes $RB_1$ 108, $RB_2$ 112 and $RB_3$ 116, where $RB_1$ 108 and $RB_2$ 112 are linked by first linking relationship object 110, and where $RB_2$ 112 and $RB_3$ 116 are linked by second linking relationship object 114. Although AIE rule 120 has been illustrated as having three RBs 107, the AIE rule 120 (and other AIE rules) may, in other embodiments, have more or less than three RBs 107.

Each linking relationship object generally defines which field content(s) of processed facts in one RB 107 is(are) to be used as a key or keys into the processed facts in an adjacent RB 107 to determine if the adjacent RB's 107 condition has been satisfied as to the key(s). Each linking relationship object may also define a particular time period (as measured from any appropriate reference time, such as the satisfaction of a condition of an adjacent RB 107) within which a condition of an adjacent RB 107 must be satisfied in order for an event to be generated. More specifically, upon one RB 107 firing (i.e., upon the condition of the RB 107 being satisfied), the AIE 100 then proceeds to evaluate whether the conditions of one or more adjacent RBs 107 have been satisfied in relation to the particular equated field content(s) in the linking relationship object(s).

For instance, assume the "classification" fields of first and second adjacent RBs 107 were equated in a linking relationship object and that one of the first and second adjacent RBs 107 fired. In this case, the specific classification field content (e.g., "attack," "compromise," "suspicious," or the like) of the satisfied condition of the one RB 107 that fired would be used as a key into an index structure of data of the other RB 107 (discussed in more detail below). That is, the AIE 100 would evaluate the other RB 107 to determine if its condition has been satisfied in relation to the particular specific classification of the first RB 107. As another example, an "impacted" unit (e.g., host, network, region, etc.) in one RB 107 could be equated to a corresponding "origin" unit (e.g., host, network, region, etc.) in an adjacent RB 107. The first and second linking relationship objects 110, 114 may be the same or different. Numerous other examples of linking relationship objects are envisioned (e.g., equating one or more of direction, domain, entity, etc. fields of adjacent RBs). As will be discussed in more detail below, the fields specified in linking relationship objects may be "group by" fields (i.e., fields by which log messages processed by an RB 107 will be aggregated for use in AIE rule execution). A similar process would occur with other RBs 107 of the particular AIE rule in question.

In any case, and upon it being determined that each of $RB_1$ 108, $RB_2$ 112 and $RB_3$ 116 has a satisfied condition 128, one or more events 133 may be generated in any appropriate manner and eventually passed to the event manager 104 for further processing (e.g., such as to determine whether alarms, alerts or remediation should be sent or performed). In one arrangement, the final RB that determines its condition has been satisfied may function to generate the event 133. In another arrangement, a separate module or manager (e.g., an "event generator") may be provided that operates to receive satisfied condition objects 128 from RBs, confirm that all RBs of a particular AIE rule have generated satisfied condition objects (or otherwise that their conditions have been satisfied), and correspondingly generate one or more events 133. In any case, each event 133 may be in the form of an object or message including any appropriate number of metadata fields that summarize the event (e.g., source IP address, bytes of data transferred out of the network, etc.).

The one or more RBs 107 can allow what may be complex events to be detected from disparate types of data over various time periods or increments. For instance, a network administrator may be interested in knowing about any server backup processes that started but never finished. Here, one RB 107 (e.g., $RB_A$) could be designed to fire when a backup for any internal server has started, and a second RB 107 (e.g., $RB_B$) could be designed to fire when no "server backup completion" messages have been received or generated within a particular period of time after the server backup process begins (e.g., 5 hours). A linking relationship object between $RB_A$ and $RB_B$ may specify, for instance, that A.IPaddress(destination)=B.IPaddress(origin). In this regard, upon the condition of $RB_A$ being satisfied (e.g., $RB_A$ detecting that an internal server backup has started, which may be indicated in a log message possibly generated by the internal server), the AIE 100 would then obtain the specific IP address in the destination IP address field associated with the server backup process and use it as a key into an index structure of the data of $RB_B$ to determine whether the specific IP address exists in an origin IP address field of a server backup completion message in the 5 hours after the server backup process started.

Figure 3:
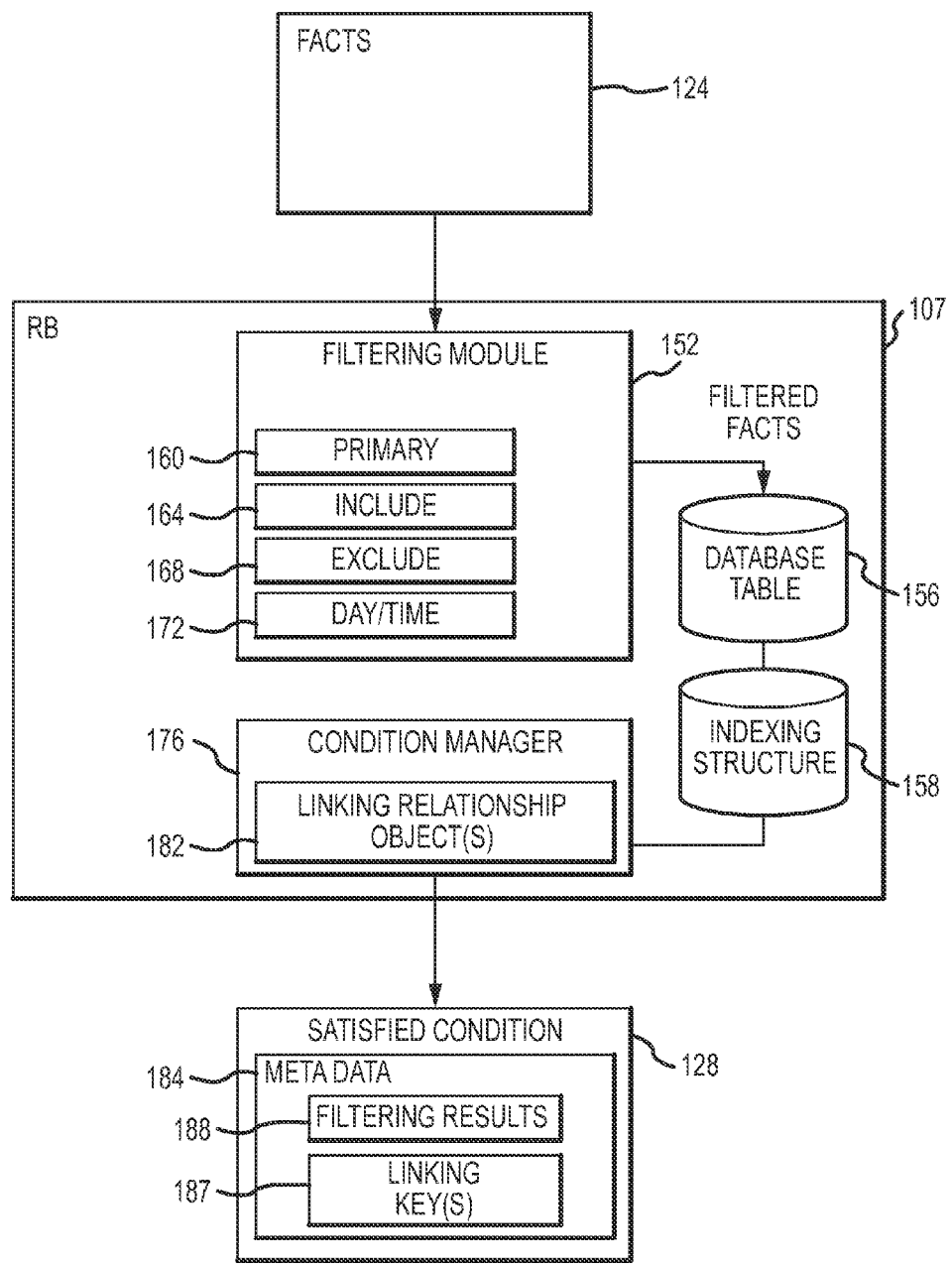
FIG. 3 is a block diagram illustrating a more detailed view of one of the rule blocks (RBs) of an AIE rule shown in FIG. 2 according to one embodiment, and illustrates data flow and processing occurring between one or more fact sources and the RB.

With additional reference now to FIG. 3, a schematic block diagram illustrating processing performed at or by an RB 107 (e.g., one or more of $RB_1$ 108, $RB_2$ 112, or $RB_3$ 116) is shown. The RB 107 may generally include one or more filters that are operable to perform a conditional check on some part of the incoming facts 124 to either subject the fact(s) 124 to further processing (e.g., as part of determining whether a "condition" of the RB 107 has been satisfied) or reject or otherwise ignore the fact(s) 124. As shown, the RB 107 may include a filtering module 152 that may include a "primary criteria" filter 160 where all specified filters must be matched in order for a log message to be collected and processed. For instance, a user may choose to filter incoming facts 124 based on a particular classification (e.g., "attack," "compromise," "suspicious," or the like) of the facts 124 (where the classification of a fact 124 may be contained within a particular metadata field associated with the fact 124). As additional examples, a user could additionally or alternatively choose to filter incoming facts 124 based on a particular originating country (e.g., China, Syria, etc.), impacted IP address, etc. of the fact 124.

Another filter may be an "include" filter 164 where if one or more include filters 164 are specified, an incoming fact 124 must match at least one of the specified include filters 164 in order for the fact 124 to be collected and processed. Another filter may be an "exclude" filter 168 where if one or more exclude filters 168 are specified, an incoming fact 124 cannot match any of the exclude filters 168 in order for that fact 124 to be collected and processed. Another filter may be a day/time filter 172 where a fact 124 must fall within any specified day of week and/or time of day filters (as determined by any appropriate time stamp associated with the fact 124). It should be understood that the aforementioned filters are only for exemplary purposes and the present disclosure should not be construed as being limited to such filters.

For instance, one or more of the filters in the filtering module 152 may be used to filter for a particular type or types of log messages as part of what may be referred to as a "log" RB 107. That is, the filtering module 152 may be used to monitor for or observe a particular type of log message or messages. For instance, the filtering module 152 may be used to detect that a known malicious IP address has made contact with a particular network device (e.g., device 22 in FIG. 1) by way of receiving and filtering for log messages generated by the device 22 indicative of the contact by the malicious IP address.

In any case, the initial filtering module 152 may store filtered facts 124 (i.e., an outcome of the evaluation) and/or metadata (e.g., IP addresses, classifications, TCP/UDP ports, etc.) related to the filtered facts 124 in at least one "in-memory" fact or data structure 156 (e.g., storage, container, table, etc.) in any appropriate manner. Furthermore, at least one indexing structure 158 may also be provided to allow for rapid lookups and quick access of facts 124 and/or related metadata in the data structure(s) 156. Each indexing structure 158 may be organized or constructed according to the particular linking relationship object 182 that links the RB 107 to one or more other RBs 107. For instance, if a linking relationship object 182 specified that an impacted IP address in a first RB 107 was to be equated to an origin IP address in a second RB 107, then the indexing structures 158 of each of the first and second RBs 107 could include a list of IP addresses, each of which identifies and allows for access to a corresponding filtered fact(s) 124 in the data structures 156. Upon one of the first and second RBs 107 determining that its condition has been satisfied and passing the specific IP address of the fact(s) 124 that caused the condition to be satisfied to the other of the first and second RBs 107 (e.g., as part of a satisfied condition object 128), the other of the first and second RBs 107 could then utilize the specific IP address as a key into its corresponding indexing structure 158 to determine whether its condition has been satisfied as to the specific IP address. This arrangement advantageously facilitates the rapid determination as to whether RB conditions have been satisfied and as to whether events of an AIE rule encompassed by one or more RBs should be generated.

In one arrangement, the AIE 100 may automatically determine the type and format of one or more indexing structures 158 to enable the efficient evaluation of AIE rules. For example, assume a first RB 107 ($RB_1$) filters for facts according to IP address and host name, and a second RB 107 ($RB_2$) filters for facts according to host name and user. Also assume the linking relationship object between $RB_1$ and $RB_2$ specifies that $RB_1$.Host=$RB_2$.Host. Here, the AIE 100 (e.g., via a translator) may automatically determine that $RB_1$ needs a primary index structure 158 on IP:Host and a secondary index structure 158 on host due to its symmetric link with $RB_2$ on Host (e.g., as $RB_2$ could fire, requiring $RB_1$ to evaluate its condition using the key of the specific content of the host field received from $RB_2$). Likewise, the AIE 100 may determine that $RB_2$ needs a primary index structure 158 on Host:User and a secondary index structure 158 on Host. In the case where an additional RB (e.g., a third RB 107 such as $RB_3$) is to use the data from $RB_1$ (e.g., either as part of a current AIE rule or a different AIE rule) where a link relationship object between $RB_1$ and $RB_3$ involves an IP address, the AIE 100 would automatically add an additional secondary index to $RB_1$ on IP (which would not have been necessary in the former example).

With continued reference to FIG. 3, the RB 107 may also include a condition manager 176 that operates to determine whether a satisfied condition object 128 is to be generated based on the presence and/or absence of particular filtered facts 124 in the data structure 156. The condition manager 176 may make such determinations by way of accessing the indexing structure 158 and/or data structure 156 and may do so according to any appropriate schedule (e.g., seconds, minutes, hours), upon newly filtered facts 124 being received and/or stored, and the like.

For instance, a user may specify that the condition manager 176 is to generate a satisfied condition object 128 upon the initial filtering module 152 "observing" or otherwise collecting and storing one or more particular types of facts 124 in the data structure 156 (e.g., collecting a fact 124 that includes the above discussed malicious IP address, collecting facts 124 that have a classification of "compromise," etc.). As another example, a user may specify that the condition manager 176 is to generate a satisfied condition object 128 upon the filtering module 152 "not observing" and thus not storing one or more particular types of facts 124 (e.g., during a particular time period). For instance, the filtering module 152 could be designed to detect whether a particular router or server has not generated a "heartbeat" type log message during every particular time period (e.g., every 30 minutes). In this example, the condition manager 176 could generate a satisfied condition object 128 upon the RB 107 failing to receive a heartbeat message from the particular router or server at the end of a 30 minute segment. A user could also specify that the condition manager 176 is to generate a satisfied condition object 128 upon the filtering module 152 "not observing" one or more particular types of facts 124 after another (i.e., adjacent) RB 107 has generated a satisfied condition object 128.

As shown, the condition manager 176 may also include or have access to a linking relationship object 182 which generally represents a linking relationship between this RB 107 and one or more adjacent RBs 107 (e.g., in relation to specific fields between adjacent RBs 107 that are to be equated, particular time periods within which respective conditions of the adjacent RBs 107 must have been satisfied in order for an event to possibly be generated, etc.). In the case where the condition manager 176 of this RB 107 has determined that its condition has been satisfied (e.g., it has "observed" particular facts), the condition manager 176 may access the linking relationship object 182 to determine which of the fields of the observed facts is to be extracted and passed to an adjacent RB 107 (e.g., for the adjacent RB's 107 determination as to whether its condition has been satisfied in relation to the extracted field). In the case where the condition manager 176 has received a linking relationship field content (e.g., a linking "key") from an adjacent RB 107 (the specific field content, e.g., IP address, extracted as part of an adjacent RB 107 determining that its condition has been satisfied), the condition manager 176 may then utilize the linking key to determine if a corresponding entry exists in its corresponding indexing structure 158, and then make a decision as to whether its condition has been satisfied based on a result of the determination.

With continued reference to FIG. 3, a generated satisfied condition object 128 may include metadata 184 such as filtering results 188 (e.g., time range of the query, quantitative values that led to a successful triggering of the RB 107, time stamps, the totals of filtered log messages according to selected "group by" parameters, and/or the like), linking keys 187, and the like. In the case where an RB 107 is the first RB 107 of an AIE rule to have its condition satisfied, the satisfied condition object 128 may be passed to adjacent RBs 107 which may utilize the metadata 184 as part of determining whether their respective conditions have been satisfied and thus whether events are to be generated. In the situation where an RB 107 is the last RB 107 of an AIE rule to have its condition satisfied, the RB 107 may either function to cause the generation of an event 133 by itself or else pass a satisfied condition object 128 to an event generator which may function to do the same.

In any case, and upon the satisfaction of all RBs 107 of an AIE rule and thus satisfaction of the AIE rule as a whole, the metadata 184 of the one or more RBs 107 making up the AIE rule may be written (e.g., in a structured format) to one or more fields of an entry in an event data store (where the various written data collectively makes up an "event"). In addition to the various pieces of metadata 184, other data may be written such as a value that identifies the specific AIE rule used to generate the event, the timestamp of the last edit time of the AIE rule, and the like. The writing of events to an event data store will be discussed in more detail below.

Figure 4:
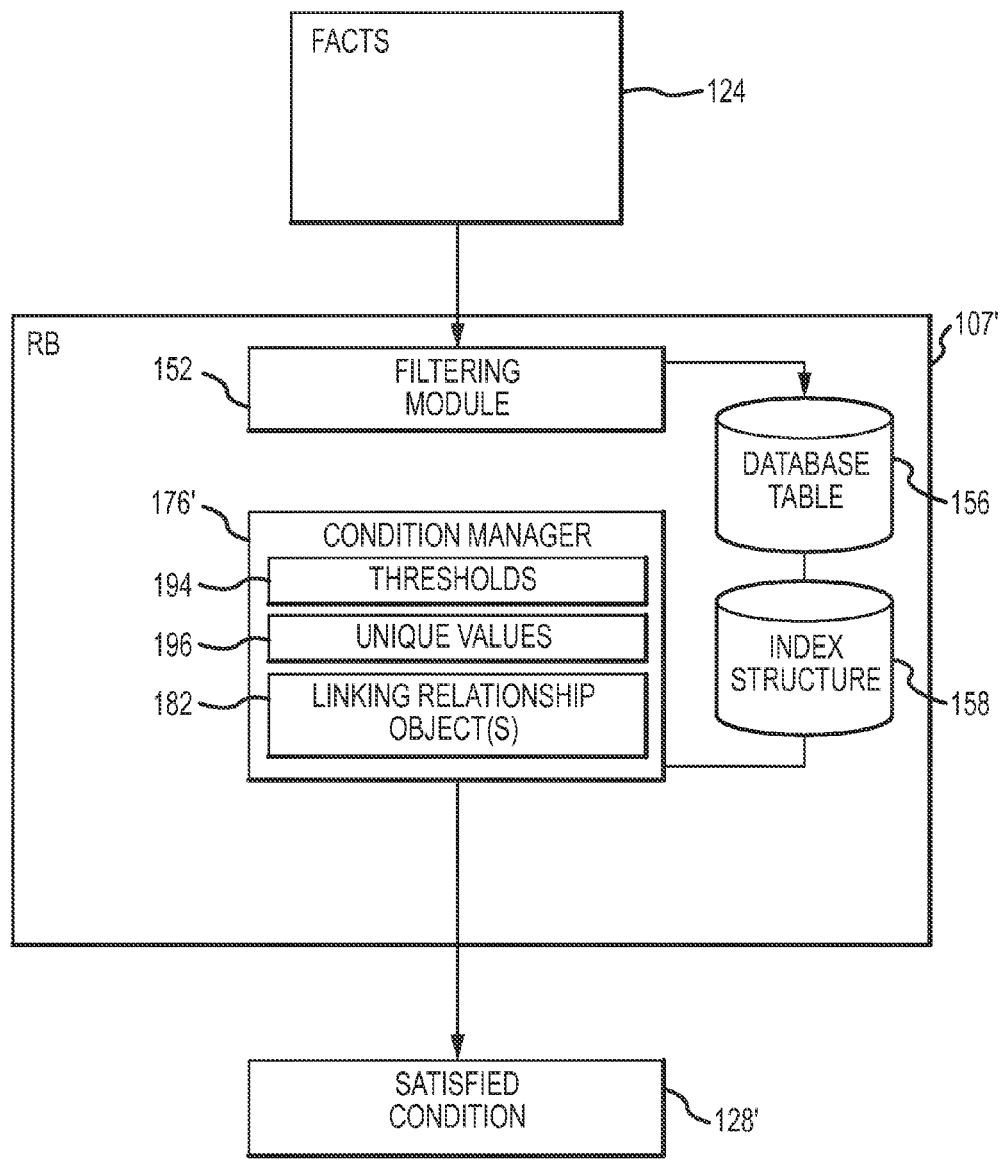
FIG. 4 is a block diagram illustrating a more detailed view of one of the rule blocks (RBs) of the AIE rule shown in FIG. 2 according to one embodiment, and illustrates data flow and processing occurring between one or more fact sources and the RB.

With reference to FIG. 4, another embodiment of an RB 107' is shown. Corresponding components/modules between the embodiments of FIGS. 3 and 4 are identified by common reference numerals and those that differ in at least some respect are identified by a "single prime" designation in FIG. 4. For clarity, the various components/modules of the filtering module 152, condition manager 176 and satisfied condition object 128' have not been shown. One difference between the RB 107 of FIG. 3 and the RB 107' of FIG. 4 is the inclusion a "thresholds" object 194 and/or a "unique values" object 196 that the condition manager 176' of the RB 107' uses to determine whether a satisfied condition object 128' is to be generated. More specifically, the thresholds object 194 allows a user to specify one or more particular thresholds for quantitative fields of data in the data structure 156 (as filtered by filtering module 152) which the condition manager 176' uses as part of determining whether or not to generate a satisfied condition object 128'. Examples of fields that may be considered for threshold consideration include, but are not limited to, log count, bytes in, bytes out, total bytes, items in, items out, total items, quantity, amount, rate, size, duration, and/or the like. For instance, a user could use the thresholds object 194 to specify a log count of 1,000. The user could also specify that the condition manager 176' is to generate a satisfied condition object 128' when a log count of 1,000 has been observed within any appropriate period of time (e.g., within 24 hours).

For instance, the condition manager 176' may query the data structure 156 according to any appropriate schedule and/or when new facts arrive in the data structure 156 to determine whether a log count of 1000 has been reached in a 24 hour period. It should be appreciated that a condition that was false just minutes ago (e.g., log count of 900 in 24 hour period) could suddenly become true (e.g., log count of 1500 in 24 hour period), such as with a sudden influx of facts 124, or simply by virtue of the 24 hour window continually shifting (e.g., the time window may not encompass a log count of 1000 one minute and encompass a log count of 1000 the next minute). In this regard, the condition manager 176' may be configured to query the data structure 156 for thresholds as often as appropriate based on the particular type of threshold being monitored. In one arrangement, the condition manager 176' may query the data structure 156 according to predetermined schedule (e.g., every 5 minutes) when the particular count or quantity is relative low (e.g., less than 70% of the threshold), and then dynamically begin querying the data structure 156 upon each new fact 124 or group of facts 124 being stored in the data structure 156, such as in relation to somewhat predictable counts (e.g., to conserve processing resources).

Alternatively, the user could specify that the condition manager 176' is to generate a satisfied condition object 128' upon a particular threshold not being observed within a particular time period (e.g., a log count of 1,000 not being observed within any 24 hour period, or not being observed with 24 hours after an adjacent RB's 107 condition has been satisfied. Users may also use the thresholds object 194 to specify thresholds for more than one field, and may specify that satisfaction of one or all of the thresholds is required for satisfied condition object 128' generation. Furthermore, the filtering results 188 in the metadata 184 of the pending event 128' (see FIG. 3) may include various types of information such as the specific quantitative field(s) and threshold(s) observed or not observed, the specific value of the particular quantitative field reached upon or before generation of the pending event 128', the time limit or period within which the threshold was observed or not observed, time stamps, and/or the like.

With continued reference to FIG. 4, the "unique values" object 196 allows a user to specify one or more unique values or occurrences that must be observed or not observed in the facts 124 in the data structure 156 as processed by the filtering module 152 in order for a satisfied condition object 128' to be generated. Fields such as log source entity, log source host, direction, domain, sender, and the like may be used for unique value consideration. As an example, an administrator may use the unique values object 196 to specify a condition for this RB 107' such as "more than three unique destination IP addresses for a given source IP address observed" (or not-observed) in the data structure 156. Furthermore, a user may specify a time period within which the particular count of unique values must be observed or not observed for generation of the satisfied condition object 128'. The filtering results 188 in the metadata 184 of the satisfied condition object 128' may include various types of information such as the specific unique value(s) observed or not observed, the count of the unique value(s) observed or not observed, the time limit or period within which a particular count of a unique value(s) was or were observed or not observed, the particular fields being considered for unique values at the time of satisfied condition object 128' generation, and/or the like.

In one arrangement, the AIE 100 may maintain a "unique value" indexing structure 158 that allows for the efficient determination of the count of unique values seen of a specific data field (e.g., destination IP addresses) of facts over a particular interval of time. Initially, the AIE 100 may monitor for the number of unique values of the specific data field (e.g., the key) in each of a plurality of time intervals (e.g., "bins"), where the sum of the various bins equals the particular time period over which the unique values are to be measured. For instance, for a 30 minute time period, the AIE 100 may monitor three 10-minute bins, thirty 1-minute bins, etc. In any case, the AIE 100 may then perform a query to examine the bins and efficiently ascertain the total number of unique occurrences of the key in the 30 minute time period (e.g., via performing "set union" operations with like-type sets from other bins). The AIE 100 may automatically request creation of a unique values indexing structure 158 to efficiently manage RB queries.

Figure 5:
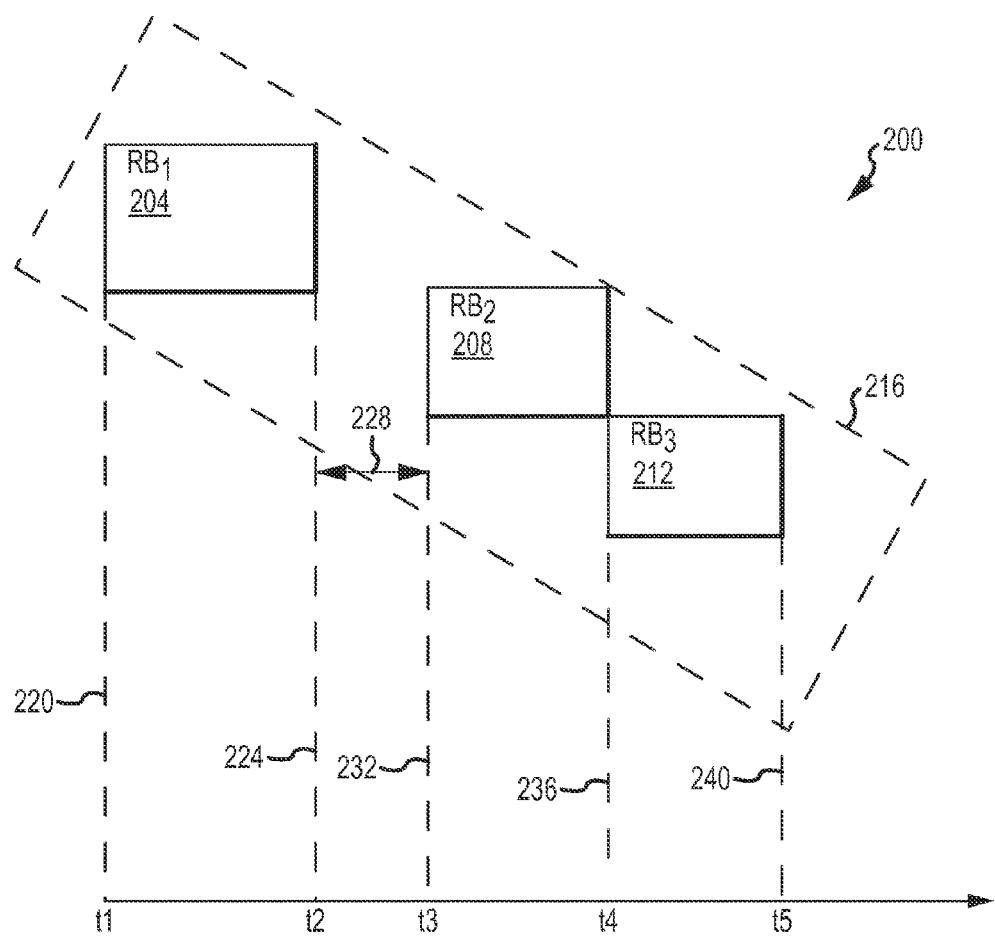
FIG. 5 is a block diagram illustrating an evaluation schedule including three RBs.

Turning now to FIG. 5, a schematic block diagram is shown illustrating a representative timeline 200 of RB evaluation or consideration for an AIE rule 216 made of $RB_1$ 204, $RB_2$ 208 and $RB_3$ 212. As discussed previously and as will be discussed in more detail later in this discussion, a user may specify (e.g., via any appropriate user interface in communication with the AIE 50 or 100) any appropriate temporal manner in which RBs are to perform evaluations to determine whether their conditions have been satisfied. In some situations, a user may be able to specify that an RB is to perform an evaluation in relation to the time of the day and irrespective of when other RBs are evaluating their conditions or when their conditions are (if at all) satisfied. More specifically, the user may specify a time zone, start time, end time, frequency, one or more monitoring intervals, and/or the like for evaluation of an RB. For example, if a user specified a start time of 1:00 AM and a frequency of 5 minutes, evaluations could occur between 1:00:00 and 1:04:59, 1:05:00 and 1:09:59, 1:10:00 and 1:14:59, etc. until an end day or time was reached (which may cease before any specified end time if the RB has generated a satisfied condition object 128 or 128').

In other situations, additionally or alternatively, a user may be able to specify that an RB performs its evaluation in relation to when an adjacent RB's condition was satisfied. For instance, a user may be able to specify that upon an RB receiving a satisfied condition object or other notification that an adjacent RB's condition was satisfied, the RB may begin its evaluation for any desired period of time. Furthermore, such desired period of time may be effectively offset in relation to the time at which the adjacent RB's condition was satisfied (e.g., as measured from the timestamp of the filtered fact(s) 124 that lead to the determination that the adjacent RB's condition was satisfied as opposed to the time that the adjacent RB determined that its condition was satisfied or the time that the current RB received notification that the adjacent RB's condition was satisfied).

In one embodiment, one RB may begin its evaluation for a period of time that starts upon satisfaction of an adjacent RB's condition (e.g., where the adjacent RB detects that an external IP address connected with an internal IP address, and the one RB is detecting for large data transfers from an internal IP address to an external IP address in the 30 minutes immediately after the external/internal connection). In another embodiment, one RB may be configured to effectively begin its evaluation at a time before the adjacent RB's condition was satisfied. More specifically, upon an adjacent RB's condition being satisfied at a particular time (e.g., time of the timestamp(s) of the filtered fact(s) 124 leading to the determination that the adjacent RB's condition was satisfied), the one RB may evaluate its filtered facts 124 beginning with filtered facts 124 associated with timestamps that are some period of time earlier than the time at which the condition of the adjacent RB's was satisfied.

It is also noted that in many situations, any of the RBs of a particular AIE rule may determine that its condition has been satisfied first (i.e., regardless of an order in which the RBs are configured), whereby adjacent RBs may then make such determinations. More specifically, while it may be logical conclusion that a first RB would detect an external/internal connection before a second RB would detect large data transfers from the internal device in the 30 minutes after the external/internal connection, processing delays may cause the second RB to detect large data transfers which occurred after an external/internal connection before the first RB detects the connection. In this regard, upon the second RB detecting such a large data transfer, the first RB would then be operable to determine that its condition was satisfied if it detected an external/internal connection in the 30 minutes before the time at which the second RB determined that its condition was satisfied (i.e., measured by the time stamp of the filtered fact(s) 124 associated with the large data transfer. The various evaluation time periods for RBs as measured from adjacent RBs may be encapsulated within linking relationship objects that link adjacent RBs (e.g., linking relationship objects 110, 114 in FIGS. 2 and 182 in FIGS. 3-4).

In the representative timeline 200 of FIG. 5, $RB_1$ 204 begins its evaluation at time $t_1$ 220, and a satisfied condition object 128 or 128' is generated at time $t_2$ 224 (although it should be understood that $RB_1$ 204 and other RBs do not necessarily generate a satisfied condition object 128 or 128' upon every evaluation; the illustration in FIG. 5 presumes that every evaluation of a RB results in generation of a satisfied condition object 128 or 128' merely for facilitating understanding of the representative timeline 200). In this example, a user has specified that $RB_2$ 208 is to begin its evaluation at time $t_3$ 232 which is offset from time $t_2$ 224 (i.e., the timestamp of the filtered fact(s) 124 which caused $RB_1$ 204 to generate a satisfied condition object 128 or 128') by time interval 228. Also, $RB_3$ 212 begins evaluation at time $t_4$ 236 which is the same time as (or shortly after) $RB_2$ 208 generates a satisfied condition object 128 or 128'. Alternatively, $RB_3$ 212 may begin evaluation based in any appropriate relation to time $t_1$ 220, $t_2$ 224, $t_3$ 232 or $t_4$ 236 (e.g., offset from one of $t_1$ 220, $t_2$ 224, $t_3$ 232 or $t_4$ 236). Upon each of $RB_1$ 204, $RB_2$ 208 and $RB_3$ 212 generating satisfied condition objects (or otherwise determining that their conditions have been satisfied), an event may be generated.

Figure 6:
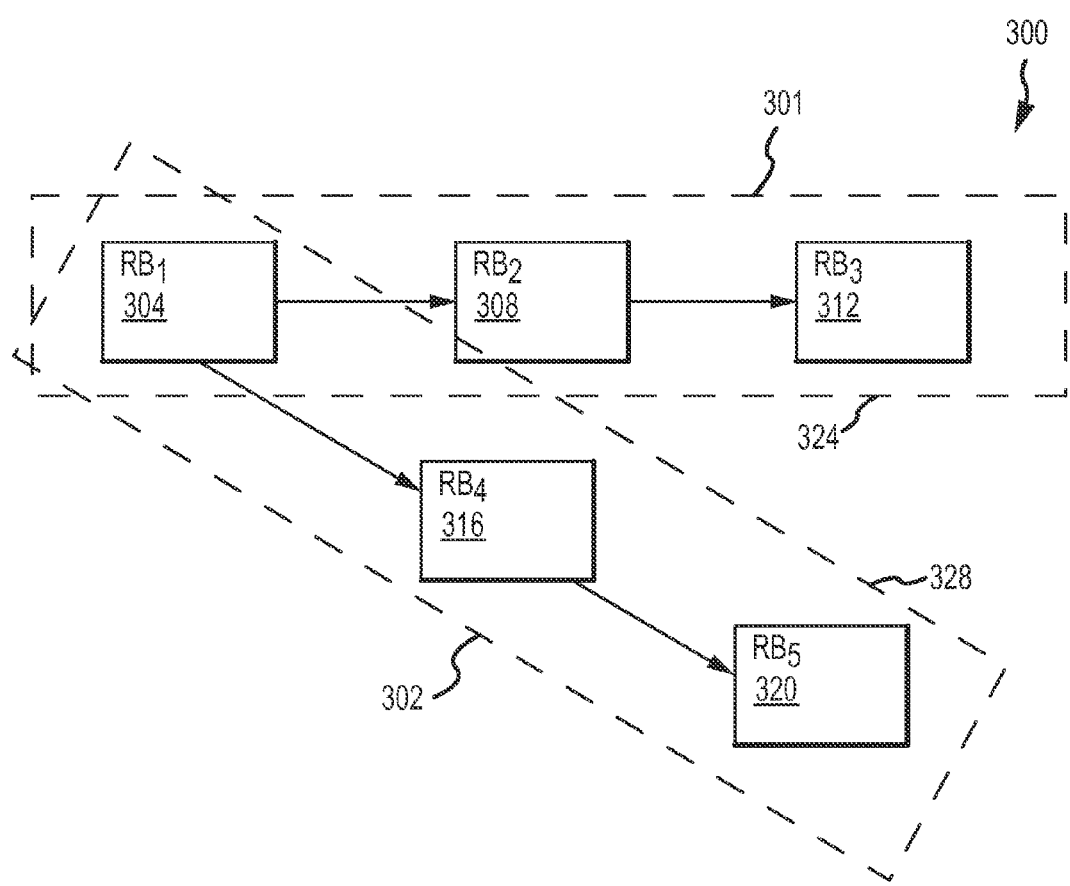
FIG. 6 is a block diagram illustrating how a group of RBs can collectively define two or more AIE rules, where the two or more AIE rules may share a common RB.

While evaluation by one or more of the RBs has been discussed in relation to time, it should be appreciated that such evaluation may commence in response or relation other parameters or occurrences as well. For instance, receipt of new or updated filtered facts 124 may trigger (in any appropriate manner) one or more of the RBs to perform an evaluation (or a reevaluation as appropriate) of the updated facts 124 (which may be together with the existing facts 124). Turning now to FIG. 6, a collection 300 of RBs is provided to illustrate how first and second AIE rules 301, 302 (or additional AIE rules) may share at least one common RB from the collection 300 of RBs in various manners. For instance, the first AIE rule 301 may include $RB_1$ 304, $RB_2$ 308 and $RB_3$ 312 while the second AIE rule 302 may include $RB_1$ 304, $RB_4$ 316 and $RB_5$ 320. This arrangement advantageously conserves or otherwise makes better use of system resources by sharing at least one common RB (e.g., $RB_1$ 304) between multiple AIE rules. For instance, upon $RB_1$ 304 generating a satisfied condition object 128 or 128', each of $RB_2$ 308 and $RB_4$ 316 could be evaluated, which evaluations, as discussed previously, may commence in any desired relation to evaluation commencement or satisfied condition object 128 or 128' generation of $RB_1$ 304. Evaluations by $RB_3$ 312 and $RB_5$ 320 may also occur according to any desired scheduling. It should be appreciated that administrators may construct various complex arrangements of RBs to define any appropriate number of AIE rules.

Figure 7:
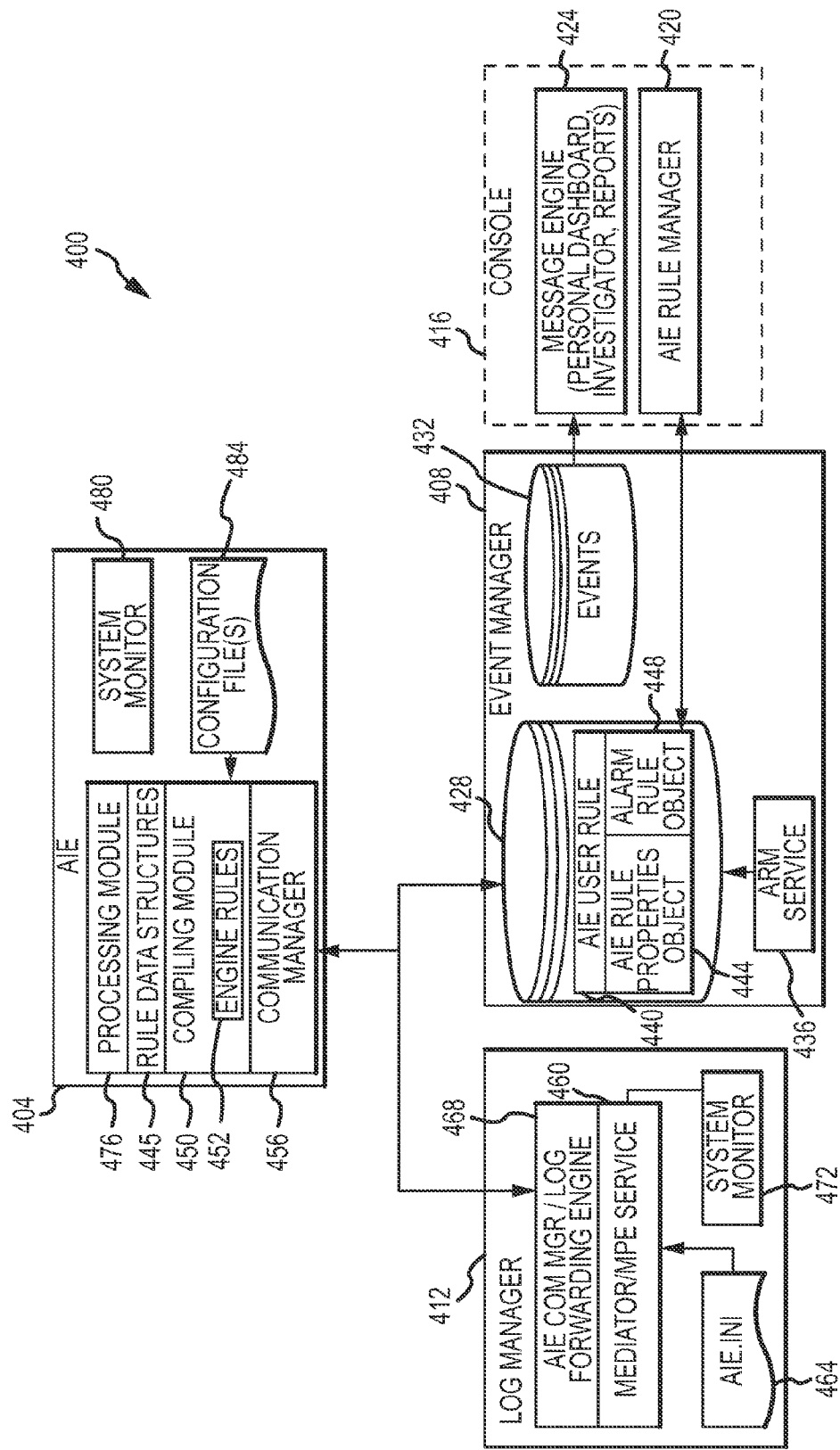
FIG. 7 is a block diagram illustrating data flow and processing occurring among a user console, an event manager, an AIE and a log manager.

With reference to FIG. 7, a system 400 is shown that illustrates components/modules of and interrelationships among a source of log data such as a log or structured data manager 412 (e.g., log manager 30), a user console 416, an event manager 408 (e.g., event manager 38, 104) logically connected and/or interposed between the log manager 412 and the user console 416, and an AIE 404 (e.g., AIE 50, 100) that is logically connected and/or interposed between the log manager 412 and the event manager 408. As will be appreciated from the ensuing discussion, AIE rules (e.g., AIE rules 120 in FIG. 2) may generally have at least two distinct instances: an AIE "user" rule 440 which is the instance that a user/administrator interacts with to configure the function of an AIE rule (e.g., via user console 416) and, stated otherwise, exposes the properties and settings of a AIE rule for management by the user (e.g., RBs for promoted event generation, alarm rules associated with the AIE rule that determine when an alarm is to be generated, etc.); and an AIE "engine" rule 452 which is the result of converting an AIE user rule into objects and/or structures that enable the AIE 404 to detect a desired event (i.e., the AIE engine rule is a compiled, run-time version of the AIE user rule 440 within the AIE 404).

A user may utilize the user console 416 to create/edit/delete AIE rules and view events, alarms and other messages generated as a result of AIE processing. The user console 416 may be in the form of any appropriate software package that may be run or otherwise manipulated on any appropriate computing device or system having memory for storing logic, a processor for executing the log, a display for viewing the results of processor execution, and the like. The user console 416 may be in appropriate communication with the log manager(s) 412, event manager(s) 408, AIE 404, and the like to both allow a user to manipulate components, modules and managers of the system 400 as well as receive various types of information in relation to logs, events, alarms, and the like.

For instance, the user console 416 may include an AIE rule manager 420 that exposes AIE user rules 440 for management, importing and exporting, and a message engine 424 that displays events and any associated alarms generated as a result of the events while allowing for searching and other types of manipulation of the events, alarms, etc. In one arrangement, the message engine 424 may be accessible on a "personal dashboard" of the user console 404 and may include the ability to investigate events/alarms/etc. generated as a result of AIE 404 processing (e.g., searching, one-click correlation, etc.), generate reports, and the like.

In any case, AIE user rules 440 created or edited by users via the AIE rule manager 420 may be passed to and stored on a data store 428 of the event manager 408 as a number of separate serialized objects that may be used for various purposes. For instance, during creation of an AIE user rule 440 (which, as discussed previously, includes one or more RBs, such as RBs 107 of FIG. 2), a user may configure a number of AIE user rule 440 properties, such as one or more of the following parameters or properties:

| Property | Description |
| --- | --- |
| AIE User Rule ID | A unique ID for the AIE User Rule as stored in the SysParm data store 428. |
| Name | The Name of the AIE User Rule. |
| Brief Description | A brief description of the AIE User Rule. |
| Details | Additional details pertaining to the AIE User Rule. |
| Group | A group the AIE User Rule is associated with that is used to organize the rules by type/function. |
| AlarmRuleID | An underlying Alarm object that is directly associated to the rule and may handle notification and/or eventual automatic remediation. |
| CommonEventID | A unique Common Event that is directly and solely tied to the AIE User Rule. This is the Common Event saved as part of the Event record and may carry with it Classification and Risk Rating. |
| RBs Collection | A collection containing one or more ordered RBs |
| RB Relationships | Describing how each RB is related to another RB. |
| Suppression | The amount of time in seconds that identical events should be suppressed following an immediately preceding Event. |
| IsEnabled | Enabled\|Disabled. |
| RecordStatus | Active\|Retired. |
| ExpirationDate | The datetime in UTC that the AIE User Rule should be considered disabled. |
| Permissions | Permissions for the AIE User Rule. |
| PersonID | The owner of the rule (if applicable). |
| DateUpdated | The last date record updated. |
| Version | The version of the AIE User Rule which may be used for forward/backward compatibility. |
| RecordType | Indicates if the AIE User Rule is a System or Custom rule. |

In one arrangement, the data store 428 may save the various properties as at least two serialized objects. One of the objects may be an AIE rule properties object 444 that includes various properties that may be needed by the AIE 404 for fact processing (e.g., facts 124 in FIG. 2), pending and promoted event generation, and the like (e.g., AIE User Rule ID, CommonEventID, Suppression, RB Relationships, etc.). Another of the objects may be an alarm rule object 448 which contains properties that may be needed by an alarm rule manager (ARM) module or service 436 of the event manager 408 for use in determining whether alarms, alerts, notifications, and the like should be generated upon the generation of an event by the AIE 404 (e.g., AlarmRuleID). For instance, an alarm rule may be designed to match on the CommonEventID associated with the AIE rule. The AIE 404 and ARM service 436 may appropriately query the data store 428 for the above discussed objects for use in log/event/alarm processing. In this regard, there may be an alarm rule created for every AIE rule that is then used to notify personnel when the AIE rule is satisfied and a corresponding event is generated The AIE 404 is, as discussed throughout this disclosure, generally responsible for obtaining and performing processing on facts based on one or more AIE rules and determining whether events should be generated for use by personnel in making remediation decisions, for further processing by an event manager, and the like. For instance, the AIE 404 may include a receiving module or communication manager 456 that coordinates retrieval of facts 124 log manager 412) for processing by the RBs of the AIE rules.

Before discussing additional aspects of the AIE 404, it may be useful to identify features of the log manager 412 (or log managers) that may facilitate access to log manager data by the AIE 404. As discussed in the aforementioned patent and patent application that have been incorporated herein by reference, the log manager 412 may include a processing engine and a mediator server which are collectively represented by reference numeral 460. The processing engine may be generally responsible for parsing received log messages, processing the received log messages (e.g., against one or more processing rules), assisting with event preparation, and the like. The mediator server may generally be responsible for handling connections from log agents or system monitors (e.g., system monitors 34 in FIG. 1), inserting forwarded data into databases, handling the archiving and/or destruction of log data, and the like.

The mediator server may also be configured (via an AIE configuration file 464) to forward any desired type and amount of log messages (e.g., identified log metadata) to the communication manager 456 by way of a log forwarding engine 468. For instance, upon the mediator server locating the AIE configuration file 464 and confirming that the file is valid, the mediator server may begin to forward (e.g., via the log forwarding engine 468) one or more log messages to the communication manager 456 of the AIE 404. The mediator server may pass log messages to the communication manager 456 as soon as they are received at the mediator from one or more root data sources (i.e., the mediator server may "stream" the data to the communication manager 456), according to any desired schedule and/or in response to any desired occurrence.

The log manager 412 may also have a system monitor 472 that is operable to monitor the log forwarding performed by the log forwarding engine 468 (e.g., by processing log messages generated by the log forwarding engine 468 related to the forwarding against any appropriate log processing rules). This feature may allow administrators to diagnose and remediate problems in relation to log forwarding from the log manager 412.

With reference again to the AIE 404, a compiling module 450 may receive AIE rule property objects 444 from the from the data store 428 along with rule data structures 445 and compile the AIE rule property objects 444 into AIE engine rules 452 that are prepared for execution or processing by a processing module 476. The processing module 476 may process any appropriate facts received from the communication manager 456 utilizing the AIE engine rules 452 to, as discussed previously, generate events. The processing module 476 may write events into any appropriate database, table or other data structure in an event data store 432. For instance, a written event may include the CommonEventID associated with the particular AIE User Rule ID and/or any unique metadata values that can be populated based on AIE rule satisfaction.

As previously discussed, metadata from RBs and/or other information (e.g., value(s) that identifies the specific AIE rule used to generate the event, the timestamp of the last edit time of the AIE rule, and the like) making up an event may be written to one or more fields of an event entry in an event data store. The written data, along with the original definition of the AIE rule, may enable subsequent analytic processes to take a specific event and perform a query against one or more log or structured data managers (or other data sources) to obtain, for each RB of the AIE rule, a set of data that meets the criteria of the AIE rule. As AIE rule definitions may be changed, a current edit date of the AIE rule may be compared with the version saved in the data making up the event to help provide a user with a "confidence value" that the result set will accurately reflect the definition of the rule. For instance, FIG. 24 presents a screenshot of a user interface 1100 that illustrates XML data 1104 that processing module 476 of the AIE 404 recorded or wrote for a particular event. As seen, the XML data may be compactly recorded and may include the specific criteria and time period involved for each of a number of RBs, thus enabling drilldown queries and the like to be run based on the XML data 1104.

Advantageously, an event can be written as soon as its associated AIE rule is minimally satisfied, even if additional data coming in makes the rule "more true" (e.g., data that continues to fall under the compound query conditions for a single firing of the AIE rule.). For example, an AIE rule monitoring for a threshold of data sent over a 10 minute period could conceivably be triggered by the arrival of a single fact (e.g., a single log message) with a quantity that exceeded that value, even if many additional facts continue to arrive during a 10-minute window making the total even greater). Additionally, numerous possibly expensive database updates can be avoided or at least limited by limiting the writing of the same event multiple times Furthermore, users may view (e.g., in a single screen) the data for each RB that falls logically under the definition of an AIE rule. For example, a complex 3-RB AIE may list data that satisfied RB1, then RB2, then RB3. A user may then freely view all the additional fields in those facts (e.g., log records) that did not make up the core AIE rule definition (e.g., to help determine what may have been going on). For instance, an AIE rule may only have specified conditions related to IP addresses, network Zones, and data quantities transmitted; however, a user may be able to view additional fields and ascertain that the same user is involved in many of those logs, thus raising suspicion.

Like the log manager 412, the AIE 404 may have a system monitor 480 that is operable to monitor the functionality of the various components/modules of the AIE (e.g., the communication manager 456, the compiling module 450, the processing module 476, etc.) by way of processing log messages generated by such components/modules against any appropriate log processing rules. Furthermore, the AIE 404 may also be configured by way of any appropriate configuration file 484. The ARM service 436 may retrieve any appropriate alarm rule objects from the data store 428 and events from the event data store 432 and perform evaluating or processing to determine whether alarms, notifications and/or the like should be generated. It should be appreciated that any appropriate protocols may be utilized for governing communication among and between the various components/modules of the system 400. Furthermore, the various components/modules may be implemented within separate servers, a common server, and/or the like.

Figure 8:
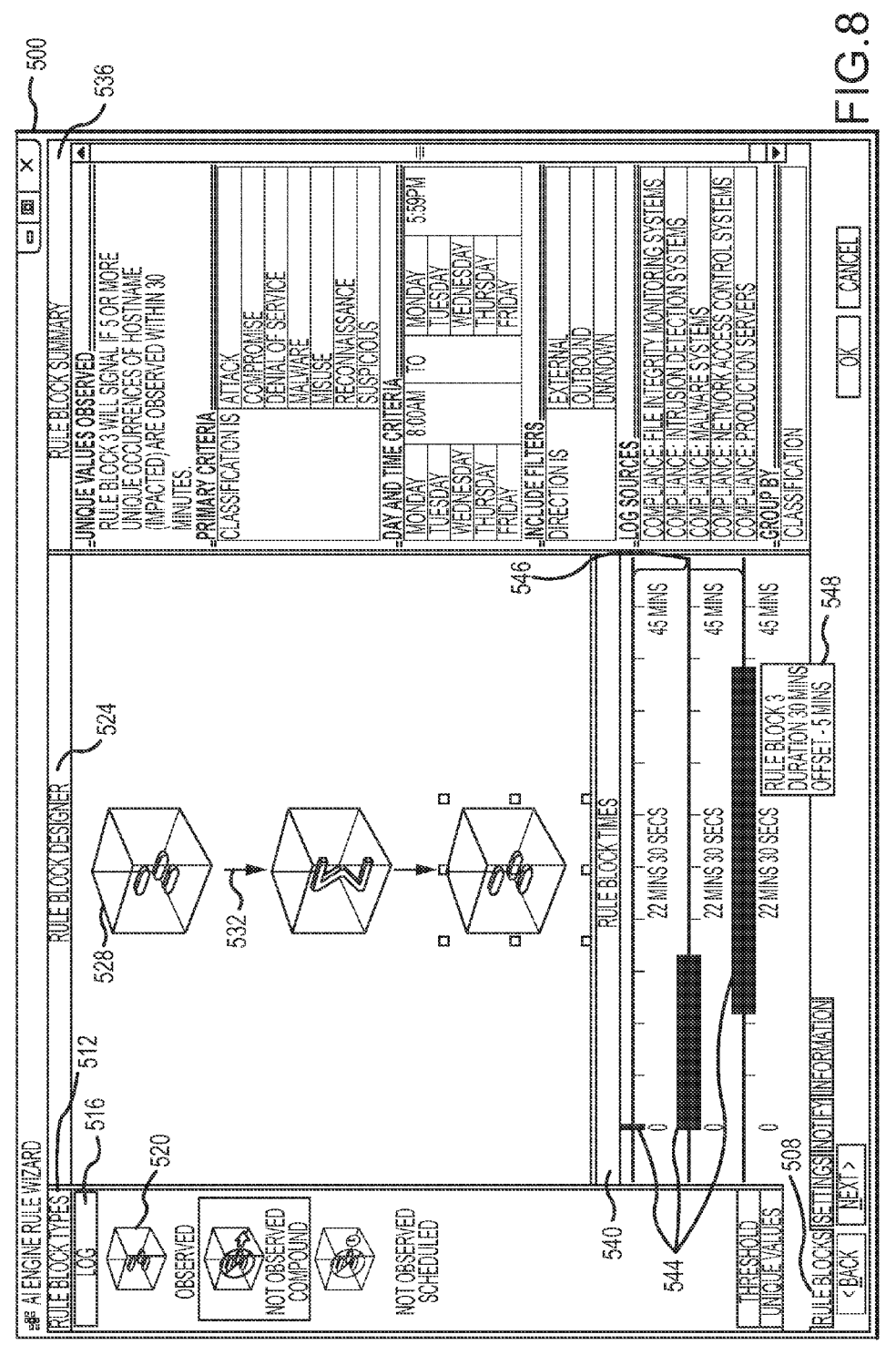

Turning now to FIG. 8, one screenshot of a user interface 500 is shown that may be presented on a screen of a user's computing device in conjunction with the creation/editing of AIE rules performed by the AIE rule manager 420 of FIG. 7. As discussed above, the AIE rule manager 420 may be made accessible to a user via the user console 416. The first part of the ensuing discussion will be in relation to a number of screenshots of a user interface that allow a user to configure a log processing or AIE rule as a whole. The second part of the ensuing discussion will be in relation to a number of screenshots of a user interface that allow a user to configure specific RBs that make up a particular AIE rule. The third part of the following discussion will be in relation to a number of screenshots of a user interface that allow a user to observe events and drill down into one or more specific events to obtain more detailed information related to the events. It should be understood that the AIE discussed herein is not be limited to use with the particular screenshots and user interfaces shown in the figures. Rather, these figures have only been provided to assist the reader in understanding how an AIE rule may be created or manipulated on a user console, according to one embodiment.

As seen in FIG. 8, the user interface 500 may include a number of tabs 508 that allow a user to toggle between various screens of the user interface 500. One of the tabs may be a "Rule Blocks" (RB) tab 508 that allows a user to select the particular types of RBs that are to be used in a particular AIE rule. Upon selection of the RB tab 508 (as illustrated in FIG. 8), the user interface 500 may display a number of regions for use in selecting particular RBs, defining their relationships, setting an evaluation offset schedule, etc. For instance, one region 512 may display a number of buttons 516 representative of the various RB types that may be included as part of an AIE rule (e.g., log, threshold, unique values). Manipulation (e.g., clicking) of one of the buttons 516 displays various graphical icons 520 that represent the various manners in which a particular RB would cause the generation of a satisfied condition object. As an example, and as shown in FIG. 8, upon a user selecting the "log" button 516, and clicking and dragging the "observed" graphical icon 520 into the "rule block designer" region 524, an RB would be added to the particular AIE rule, where the RB would generate a satisfied condition object upon particular a particular type of log message being observed by the RB (e.g., such as log data classified as "denial of service" and associated with a particular IP address, also see "log" RB 107 in FIG. 3). Other graphical icons 520 represent other manners in which a particular RB would cause the generation of a satisfied condition object (e.g., upon the particular log(s), threshold(s) and/or unique value(s) not being observed either as part of a compound rule with two or more RBs and/or after any desired time period or schedule).

The region 524 may generally allow an administrator or other user to manipulate the one or more RBs making up an AIE rule as well as their linking relationships. For instance, the region 524 may include graphical icons 528 of the RB(s) making up a particular AIE rule in addition to graphical icons 532 representing the particular linking relationship objects connecting adjacent RBs. Numerous manners of manipulating the graphical icons 528 are envisioned such as single clicking or tapping (e.g., with a mouse and cursor or via a touch sensitive screen) on a graphical icon 528 and dragging or deleting the graphical icon 528, double clicking or tapping on the graphical icon 528 to display the user interface 600 (shown in FIG. 12) for configuring the particular RB, right clicking or tapping on the graphical icon 528 to change the type of RB (e.g., from a "Log Observed" RB to a "Threshold Not Observed Scheduled" RB). Similarly, linking relationship objects may be modified or created by appropriately manipulating the graphical icons 532 to display an linking relationship user interface 700 (shown in FIG. 20). For instance, appropriate manipulation of the graphical icons 528, 532 may bring up pop-up windows, additional user interfaces, and the like.

Another region 536 of the user interface 500 may be operable to display summary type information for RBs and/or their linking relationships. In one embodiment, manipulating (e.g., single clicking or tapping) a graphical icon 528 or 532 may cause the display of summary information for the particular RB or linking relationship corresponding to the graphical icon 528, 532 in the region 524. In one arrangement, the particular graphical icon 528, 532 that was manipulated may be appropriately highlighted, marked, or otherwise modified to illustrate that the particular icon 528, 532 is the icon for which summary information is being displayed in region 536 (e.g., by displaying a series of dots or marks over the icon as shown in FIG. 8). For instance, the top of the region 536 may display a name of the RB or linking relationship corresponding to the graphical icon 528, 532 that was selected (e.g., "Unique Values Observed"), while other portions of the region 536 may display any specified information for the RB or linking relationship such as primary criteria, include filters, etc. (e.g., components of the filtering module 152 and the like discussed previously in relation to FIGS. 3 and 4).

Another region 540 of the user interface 500 may illustrate one or more time windows within which each of the RBs presented in region 524 will be processed and/or will evaluate log data, and how such time windows relate to the time windows of other RBs. As discussed previously in relation to FIG. 5, RBs can begin evaluations upon receipt of new data, according to a user-defined or default schedules, in relation to when other RBs either begin evaluations or determine that their conditions have been satisfied (e.g., as measured by the time stamps giving rise to the satisfied condition determination), and the like.

For instance, a toggle bar 544 for one RB (the top toggle bar 544 in FIG. 8) may be set at a relative time of "0" (which represents the relative time that the RB fires or in other words when the RB's condition was satisfied) and toggle bar 544 for an adjacent RB (see middle toggle bar 544 in FIG. 8) may be slid or otherwise manipulated along an axis scale 546 so that its left edge lines up with the top toggle bar 544. In this regard, and regardless of when the first RB begins processing or evaluation, the second, adjacent RB would in this example begin evaluation or processing at or just after the time that the first RB's condition was satisfied. In one arrangement, this may be the default behavior if the linking relationship between the first and second RB has an offset of zero.

In other cases, it may be desirable for the second RB to examine facts over the same time period as the first RB. For example, this may be accomplished by entering a negative offset value in the linking relationship properties user interface 700 (discussed below in relation to FIG. 20), which may be accessed by manipulating (e.g., double clicking or tapping) the particular toggle bar 544. Similar discussion applies to the toggle bar 544 representing the third RB (the bottom toggle bar 544 in FIG. 8). As another example, the toggle bar 544 representing a third RB may be dragged so that its left ledge is to the left of the right edge of the middle toggle bar 544. In this regard, the third RB may evaluate facts having time stamps associated with times that are before the second RB completes an evaluation. Furthermore, the length of at least some of the toggle bars 544 may represent the total time that the particular evaluation of the respective RB will last.

In one arrangement, hovering over a toggle bar 544 will display a tooltip 548 (e.g., "hover box") that identifies the RB, its duration and/or its offset from an adjacent RB. For instance, the tooltip 548 may be updated to display a current offset while a toggle bar 544 is being dragged. In another arrangement, an axis scale 546 may be increased as necessary when dragging toggle bars 544 to the right. In a further arrangement, a user may be prevented from dragging a toggle bar 544 off of an axis scale 546 to the left. However, as discussed previously, a user may be able to appropriately bring up the linking relationship properties user interface 700 and enter a larger negative offset if desired.

Figure 9:
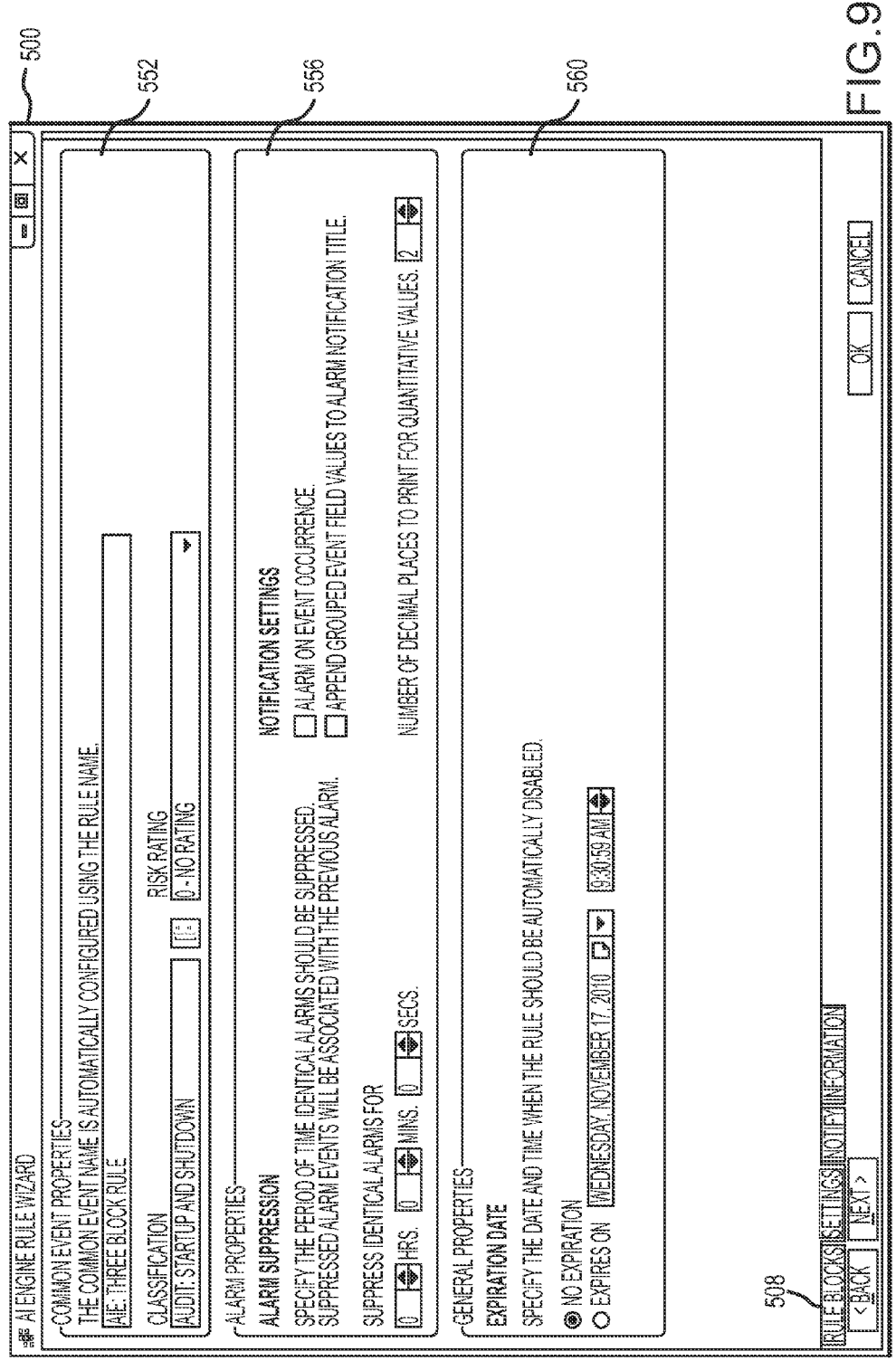

Turning now to FIG. 9, another view of the user interface 500 is presented upon a "settings" tab 508 being manipulated. In general, the settings tab 508 allows a user to modify one or more types of settings in relation to a particular AIE rule as a whole. One region 552 of this view of the user interface 500 may allow for configuration of "common event" properties of an AIE rule (i.e., an event generated in response to all RBs of an AIE rule being satisfied). The region 552 may include a portion that allows a user to define a name for the common event. For instance, the user may use the same name as that which defines the AIE rule (e.g., "AIE Three Block Rule") or may define a different name. The region 552 may include further portions that allow a classification for the common event to be defined, such as any of the standard classifications shared by alarm rules (e.g., "Audit: Startup and Shutdown") and/or a risk rating for the common event.

Another region 556 of the user interface 500 may allow for various properties of alarms associated with the AIE rule to be configured. One portion of the region 556 may allow a user to opt for an alarm to be automatically generated (and sent to any appropriate personnel) upon generation of an event and/or append grouped event field values to an alarm notification title. Another portion of the region may allow a user to suppress generated alarms that are the same as a previous alarm for a desired period of time (e.g., so as to avoid the increased network resource usage involved with generating duplicate alarms). Similarly, and although not shown, another portion of the region may allow a user to suppress generated events that are the same as a previously generated event for a desired period of time. Another region 560 of the user interface 500 may allow a user to specify whether the AIE rule is to be automatically disabled after a selected date and/or time.

Figure 10:
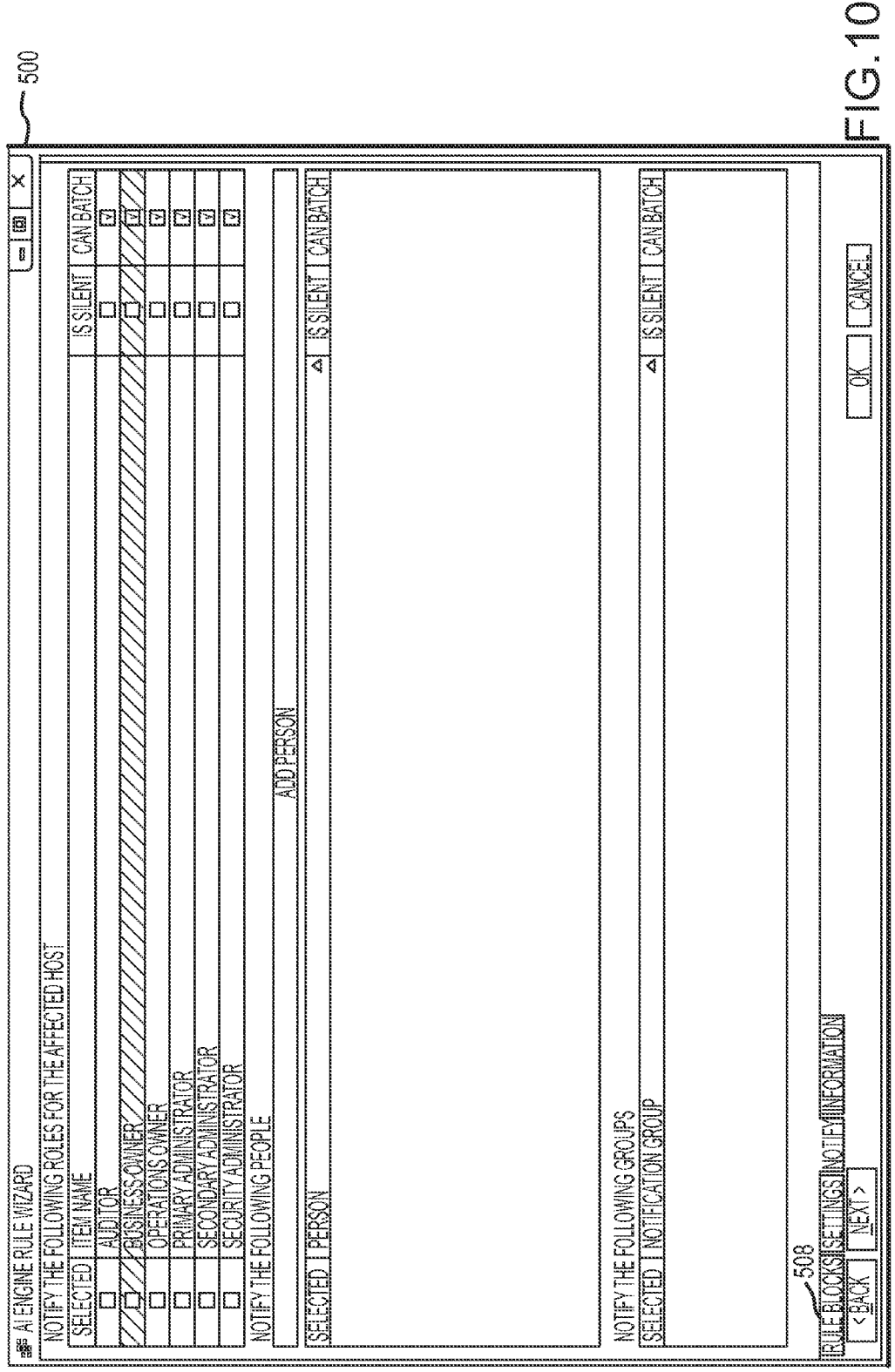

Turning now to FIG. 10, another view of the user interface 500 is presented upon a "notify" tab 508 being manipulated. In general, the notify tab 508 allows a user to specify a number of entities that are to be notified of generated events and/or associated alarms (e.g., according to role, name or group).

Figure 11:
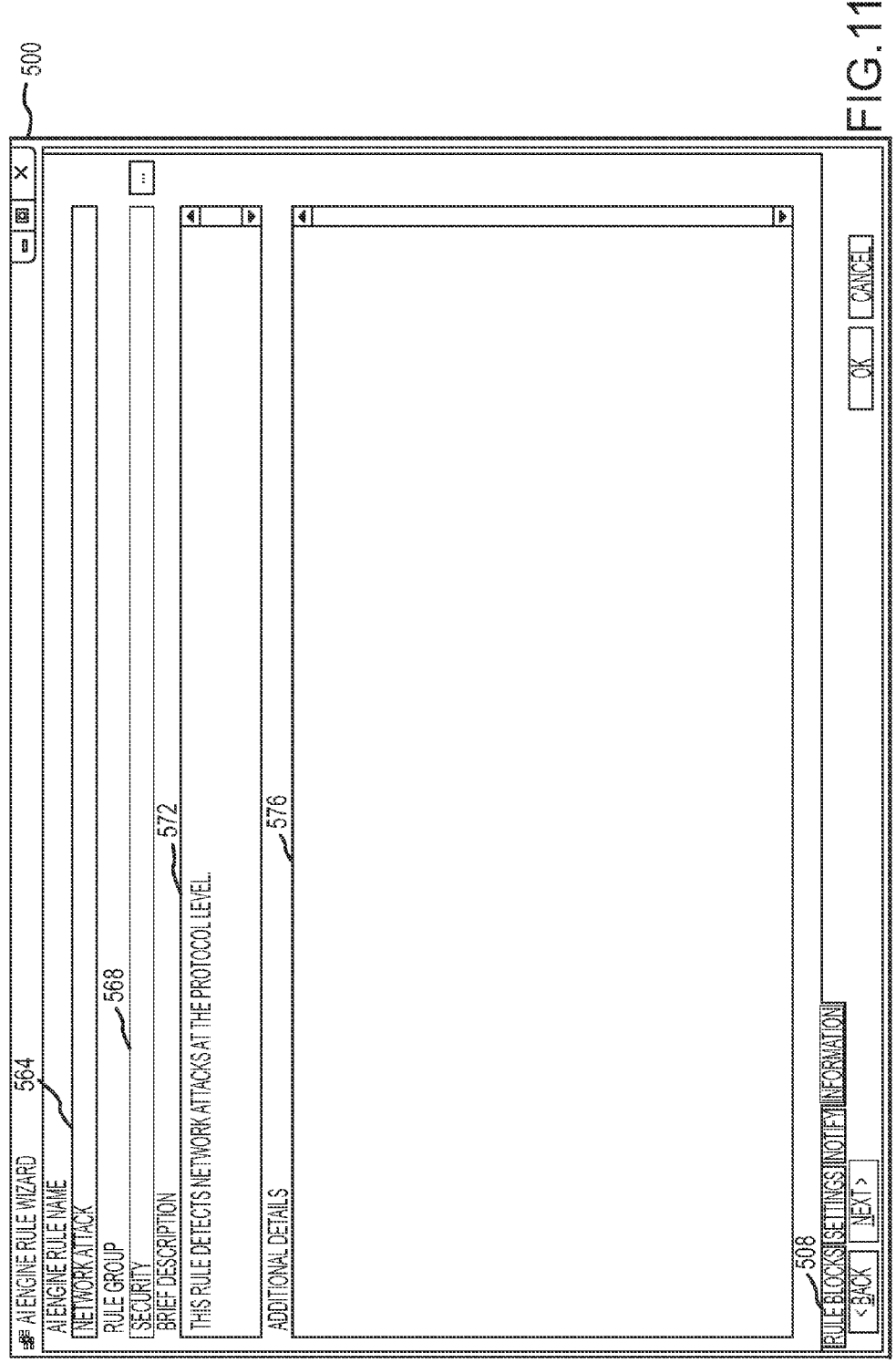

In relation to FIG. 11, another view of the user interface 500 is presented upon an "information" tab 508 being manipulated. One region 564 of this view may allow a user to specify a name of an AIE rule. As discussed previously, the common event name may be the same as (e.g., via synchronization) the AIE rule name. Another region 568 of this view may allow a user to specify a particular group that the AIE rule is to belong to. The AIE rule can be assigned to an existing group or a new one. Another region 572 may allow a user to enter an optional description of the AIE rule and/or a common event. Another region 576 may allow any desired additional details regarding the AIE rule to be entered that are associated with the AIE rule.

As discussed previously, individual RBs can also be configured to specify which facts the RB is to analyze, filters to be used by the RB, and the like. Turning now to FIG. 12, a user interface 600 is presented (e.g., upon double clicking or tapping on a graphical icon 528 in FIG. 8 and/or in one or more other appropriate manners) that allows a user to configure a particular RB that makes up an AIE rule. The user interface 600 may include a number of tabs 604 that allow a user to toggle between various screens of the user interface 600 to allow configuration of an RB. One of the tabs may be a "Primary Criteria" tab 604 that allows a user to specify one or more filters, where all of such one or more filters would have to be met by a fact (e.g., log message or other piece of data) that is to be collected and/or used by the RB for further processing (e.g., see previous discussion in relation to primary criteria filter 160 in FIG. 3). For instance, if primary criteria such as a particular domain and a particular log message direction (e.g., inbound or outbound) were specified, then all log messages collected and/or used by the RB would necessarily be associated with the particular criteria and particular log message direction. As shown, this view of the user interface 600 may include at least one portion 608 that allows a user to add, edit or delete one or more primary criteria. In one arrangement, at least one primary criteria must be specified for each RB.

As also shown in FIG. 12, the user interface 600 may also include "Include Filters" and "Exclude Filters" tabs 604 that allow a user to further customize an RB. For instance, manipulation of the Include Filter tab 604 may present another view of the user interface 600 (not shown) that allows a user to enter or specify one or more filters, where an incoming fact would need to match at least one of such "includes" filters for that message or piece of data to be collected for further processing. Manipulation of the Exclude Filter tab 604 may present another view of the user interface 600 (not shown) that allows a user to enter or specify one or more filters that may exclude facts if they match any of the exclusion filters.

Figure 13:
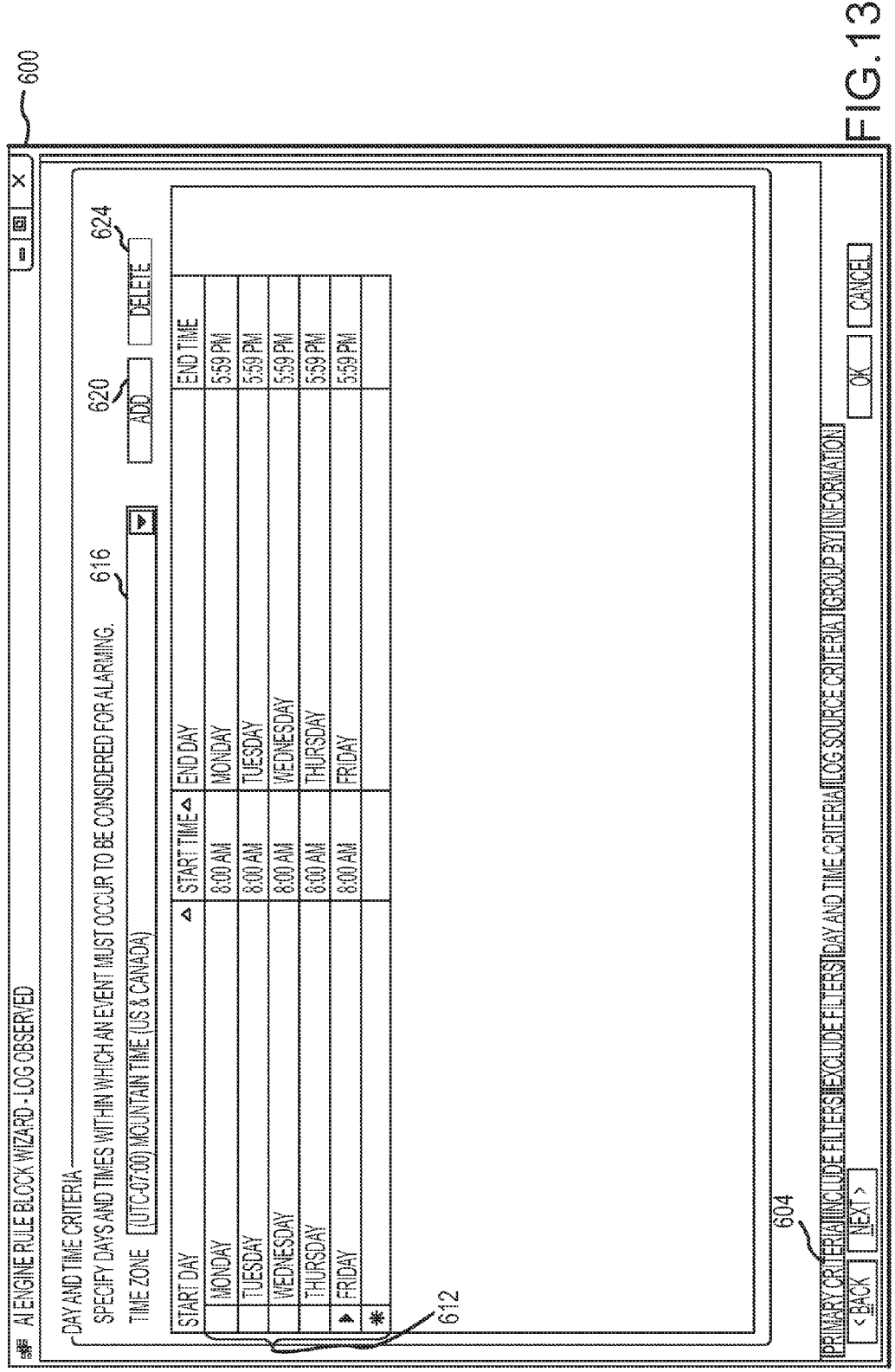

Turning to FIG. 13, another view of the user interface 600 is illustrated after a "Day and Time Criteria" tab 604 has been manipulated. This view of the user interface 600 generally allows a user to specify one or more day and/or time intervals within which log messages or other data must fall within (e.g., as determined by any appropriate time stamp associated with the logs or data) in order to be collected and/or further processed by the particular RB. As shown in FIG. 13, this view may include an intervals portion 612 whereby a user may define one or more of such intervals. For instance, each row or interval may include a number of cells (not labeled) representing start and end days and corresponding start and end times. In one arrangement, the values in a particular cell may be edited by way of manual entry (e.g., clicking or tapping on the cell and using a keyboard to enter a desired value) or via any appropriate drop-down menu.

This view of the user interface 600 may include an add button 620, the manipulation of which adds a new interval to the intervals portion 612. For instance, a first new interval may default to any appropriate day and time (e.g., Monday, 8 am to 6 pm). Subsequent intervals may default to the next day of the week with the same time as the prior interval. In one embodiment, once Saturday is reached, subsequent intervals may default to the next hour of Saturday until midnight is reached (e.g., at which point any appropriate error message may be displayed such as "Unable to add filter. The end of the week has been reached"). In addition to the add button 620, a delete button 624 may also be included that allows a user to remove selected intervals from the intervals portion 612.

For instance, intervals could be selected by manipulating the particular interval (e.g., row selectors on the left side of the interval in view of FIG. 13). As another example, multiple intervals could be selected using CTRL and SHIFT. Furthermore, the view may include a time zone portion 616 that generally allows a user to specify the particular time zone against which the specified intervals will be measured. For instance, the time zone may default to a local system time zone when this view of the user interface 600 is displayed to a user when initially configuring a particular RB. Upon a user changing the displayed time zone to a different time zone (e.g., via manipulating a drop down menu), the days and times of the intervals portion 612 may adjust accordingly.

As also shown in FIG. 13, the user interface 600 may include a "Log Source Criteria" tab 604, the manipulation of which may present another view of the user interface 600 (not shown) that allows a user to specify those particular "facts" (e.g., see above discussion in relation to facts 124 of FIG. 2) that will be filtered against the aforementioned primary criteria, include filters, etc.

Turning to FIG. 14, another view of the user interface 600 is illustrated after a "Group By" tab 604 has been manipulated. As discussed previously in relation to FIG. 3, electing to group facts in one or more manners before generation of a satisfied condition object (e.g., satisfied condition object (128 in FIG. 3) allows RB processing to work with totals by type of fact instead of only considering each fact by itself. In this regard, this view of the user interface 600 may include a portion 628 that allows a user to choose those manners in which facts may be grouped (e.g., according to account, classification, common event, impacted country, and the like).

As shown, the portion 628 may include a list 632 of types of grouping, where one or more types may be chosen by selecting a checkbox (although numerous other manners of choosing those manner by which to group facts are envisioned). In any event, any satisfied condition objects generated by this RB may include metadata with filtering results representing, inter alia, the totals of filtered facts according to the selected "group by" parameter (e.g., see discussion above in relation to FIG. 3). In some embodiments, the details of individual facts (e.g., in relation to the chosen "grouped by" fields) may no longer be available to the RB once the facts are aggregated according to the selected group by parameters.

Figure 15:
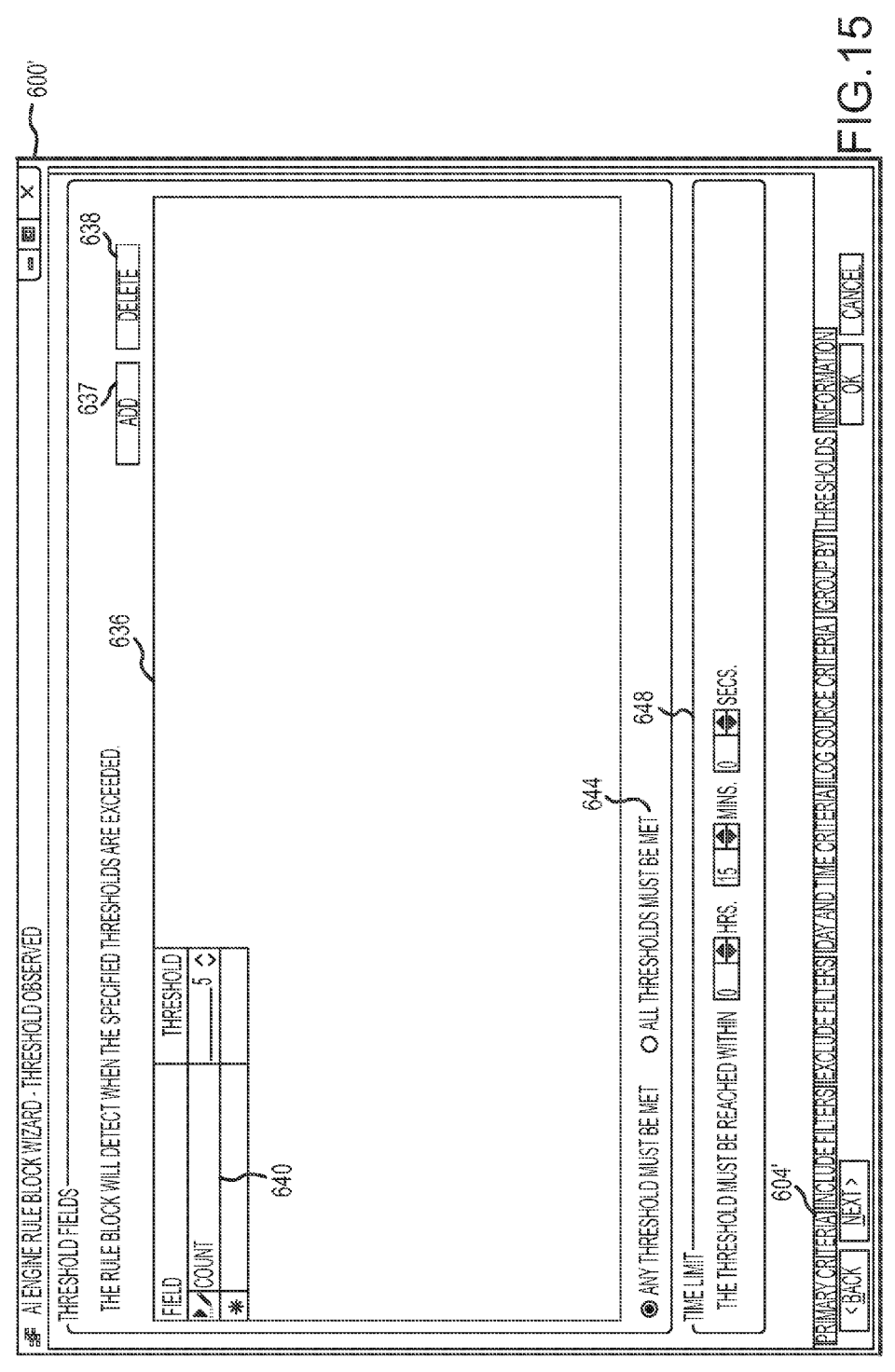

With reference to FIG. 15, another embodiment of a user interface 600' is shown. Corresponding components or aspects between the embodiments of FIGS. 12-14 and 15 are identified by common reference numerals and those that differ in at least some respect are identified by a "single prime" designation in FIG. 15. One difference between the user interface 600 of FIGS. 12-14 and the user interface 600' of FIG. 15 is the inclusion of a "Thresholds" tab 604' that is generally operable to allow a user to specify thresholds for one or more quantitative fields of filtered facts (i.e., facts that have been filtered by any primary criteria, include filters, exclude filters, etc. as shown in FIG. 12), where meeting or exceeding a particular threshold may cause the generation of a satisfied condition object for a particular RB (i.e. may cause the RB to "fire").

The user interface 600' may include a portion 636 that allows a user to specify one or more quantitative fields and corresponding thresholds for consideration (e.g., see above discussion in relation to FIG. 4). For instance, the portion 636 may include a number of cells 640 that allow users to select one or more quantitative fields (e.g., count, rate, size, etc.) and one or more corresponding thresholds (e.g., via manual entry, drop down menus, etc.). Cells 640 may be added via an add button 637 and deleted via a delete button 638 (e.g., after selecting cells for deletion via appropriately highlighting or marking the particular cell(s)).

Another portion 644 of the user interface 600' may allow a user to specify whether a satisfied condition object may be generated either upon any of the field/threshold combinations being met, or only upon all field/threshold combinations being met. Another portion 648 may allow a user to specify an amount of time within which a particular threshold must be reached in order for a satisfied condition object to be generated. For example, if a particular threshold under consideration is 100 and the time limit is 15 minutes, then the total of the facts (e.g., log messages) over any 15 minute time period must reach 100 in order for the threshold to be reached and a corresponding satisfied condition object to possibly be generated (i.e., assuming all other filters have been satisfied). As another example, if the time limit is 24 hours and the RB is only scheduled for 1 hour, then during that hour, the RB will consider facts generated over the last 24 hours. In one arrangement, if multiple thresholds are specified and all must be met, then all must be met in the same time period.

Turning now to FIG. 16, another embodiment of a user interface 600" is shown. Corresponding components or aspects between the embodiments of FIGS. 12-14 and 16 are identified by common reference numerals and those that differ in at least some respect are identified by a "double prime" designation in FIG. 16. One difference between the user interface 600 of FIGS. 12-14 and the user interface 600" of FIG. 16 is the inclusion of a "Unique Value" tab 604" that is generally operable to allow a user to specify a particular number of occurrences of unique values of one or more particular fields of filtered facts (facts filtered by the primary criteria, included filters, etc.) that may cause the generation of a satisfied condition object (e.g., more than three unique destination IP addresses for a given source IP address).

The user interface 600" may include a portion 652 that allows a user to specify one or more fields for unique value consideration as well as a number of occurrences of unique values, the satisfaction of which may cause the generation of a satisfied condition object (see above discussion in relation to FIG. 4). For instance, the portion 636 may include a number of cells 654 that allow users to select a field (e.g., URL, sender, recipient, origin/impacted location, etc.) and a corresponding number of occurrences of unique values of the selected field (e.g., via manual entry, drop down menus, etc.). Another portion 656 of the user interface 600" may allow a user to specify a particular period of time within which the particular number of occurrences of unique values of the field must be observed in order for the RB to "fire" (i.e., to generate a satisfied condition object).

Figure 17:
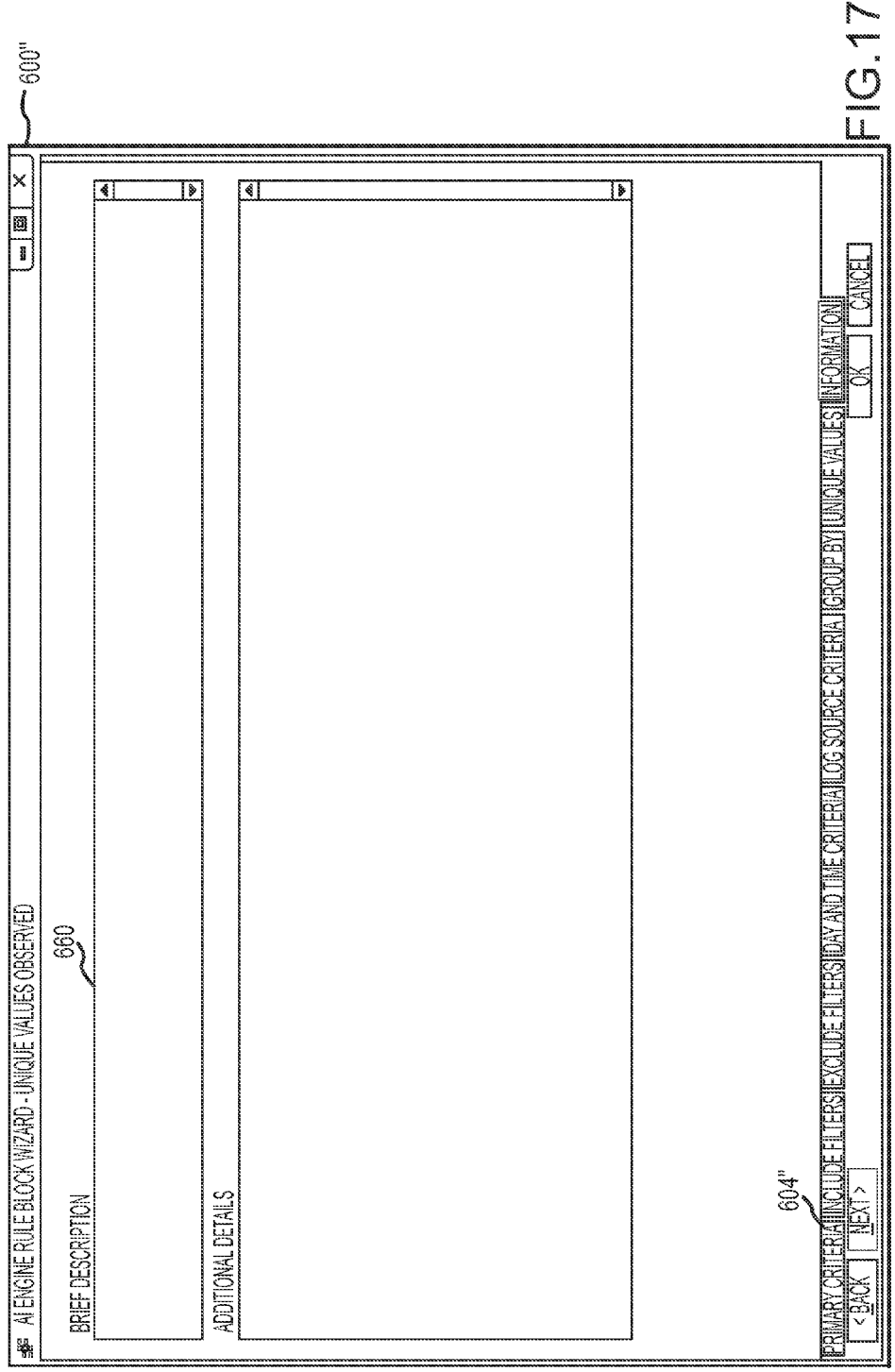

With reference to FIG. 17, the user interface 600" is illustrated after an "Information" tab 604" has been manipulated. This view of the user interface 600" may include a portion 660 that allows a user to enter a desired description of the particular RB that is being created or edited. In one arrangement, the description entered in portion 660 may be displayed on a user's display as a tooltip upon the user moving a cursor or other component over a corresponding graphical icon 528 in the rule block designer region 524 in the user interface 500 of FIG. 8.

Turning now to FIG. 18, another embodiment of a user interface 600'" is shown. Corresponding components or aspects between the embodiments of FIGS. 12-14 and 18 are identified by common reference numerals and those that differ in at least some respect are identified by a "triple prime" designation in FIG. 18. One difference between the user interface 600 of FIGS. 12-14 and the user interface 600''' of FIG. 18 is the inclusion of a "Schedule" tab 604''' that is generally operable to allow a user to specify one or more time intervals within which the particular RB will be evaluated. This feature may be useful when it is desired to monitor for the non-occurrence of a particular occurrence (e.g., determining whether a "server backup completion" log message has not been observed after a server backup has begun). Stated otherwise, this feature may be used to evaluate a particular RB during those times when facts indicative of particular occurrences would normally be expected to be generated. Thus, in the absence of receipt of a log message indicative of such an occurrence, the RB may fire.

The user interface 600''' may include a portion 664 that allows a user to specify whether the non-occurrence or non-observed nature of a particular occurrence is to be always active (i.e., the RB is to be continuously evaluated) or active according to a customized schedule (and, if so, a particular local time zone to which a normalized time of received log messages will be converted before being compared with the customized schedule to determine if they should be considered or evaluated by the RB). In one arrangement, a user may select to utilize daylight savings time rules when converting normal message times to local times.

In any event, the portion 664 may include a number of cells 668 that allow users to specify one or more time intervals within which the RB will be evaluated (e.g., by start and end days and respective start and end times). Cells 668 may be added via an add button 669 and deleted via a delete button 670 (e.g., after selecting cells for deletion via appropriately highlighting or marking the particular cell(s)). In one arrangement, a first monitoring interval may be from 8 am to 5:59 pm on Monday by default, subsequent intervals may use the same time for Tuesday through Saturday, and added intervals may advance by one hour until the end of the week is reached. Numerous other schedules are envisioned.

The user interface 600''' may also include a portion 672 that allows a user to specify an evaluation frequency for RB evaluation. For instance, the RB may be initially evaluated starting at the beginning of each of the time intervals shown in cells 668, and proceeding for the evaluation frequency amount of time specified in portion 672. Upon the non-observance of a fact representative of a particular occurrence (e.g., a log message indicative of a completion of a server backup) at the end of the first evaluation frequency period of time, the RB may fire a pending event message. The RB would continue to determine for each subsequent evaluation frequency period of time during the time interval whether an occurrence was "not observed," and, if so not observed, generate a satisfied condition object at the end of each evaluation frequency period of time. In one arrangement, a user may be able to suppress the generation of identical satisfied condition objects during any appropriate period of time.

Figure 19:
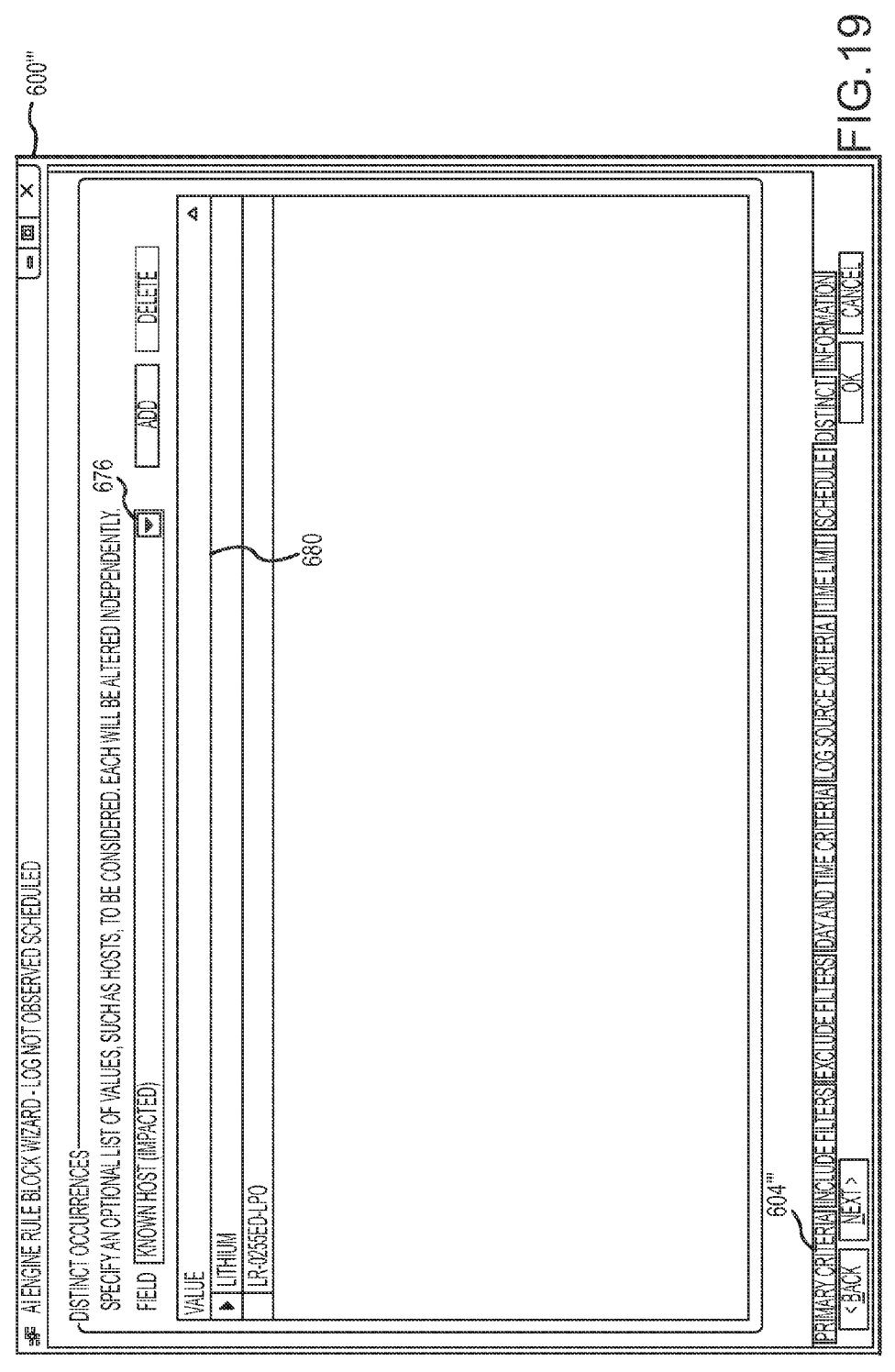

With reference now to FIG. 19, another view of the user interface 600''' is presented after a "Distinct" tab 604''' has been manipulated. This tab is generally operable to allow a user to specify a list of entities (e.g., hosts) for which a fact indicative of some occurrence (e.g., backup succeeded) should be observed. This view of the user interface 600''' may include a portion 676 that allows a user to select a field for which to specify distinct occurrences (e.g., via a drop-down menu). Another portion 680 may be included that allows a user to specify one or more values for the field for which the RB should monitor.

It should be appreciated that at least some of the above discussed user interfaces 600, 600', 600'' and 600''' or other similar user interfaces may be utilized to create one or more of "observed" RBs (i.e., RBs that fire upon a particular type of log(s), threshold(s) or unique value(s) being observed), "not observed scheduled" RBs (i.e., RBs that fire upon a particular type of log(s), threshold(s) or unique value(s) not being observed according to some particular schedule and/or evaluation frequency) and "not observed compound" RBs (i.e., RBs having at least one preceding RB that fire upon a particular type of log(s), threshold(s) or unique value(s) not being observed). For instance, while the user interfaces 600, 600' were respectively discussed above in the context of a RB firing upon a particular type or types of log(s) and quantitative field threshold(s) being observed, the same user interfaces 600, 600' or other user interfaces may be utilized to generate "not observed scheduled" log and/or threshold RBs and/or "not observed compound" log and/or threshold RBs. Numerous other combinations and examples of RBs are envisioned and are within the scope of the present disclosure.

FIG. 20 illustrates a user interface 700 that allows a user to configure a linking relationship object (e.g., linking relationship object 182 of FIG. 3) for a particular RB. As discussed previously, one manner of accessing the user interface 700 may be by manipulating (e.g., double clicking or tapping) a corresponding linking relationship graphical icon 532 illustrated in FIG. 8. As shown, the user interface 700 may include a portion 704 that allows a user to specify at least one common "group by" field (see above discussion of group by fields in relation to FIG. 3) between facts of a current RB (e.g., "Rule Block 3" in FIG. 20) and facts of an adjacent RB (e.g., "Rule Block 2" in FIG. 20).

The portion 704 may include respective cells 708 for one RB group by field, an adjacent RB group by field, and an operator (e.g., equals, or) that links the current and preceding RB group by fields. For instance, upon Rule Block 3 in FIG. 20 firing first, the specific content of the "classification" field (e.g., "Reconnaissance") of the fact(s) which caused Rule Block 3 to fire would be used as a key into an index for facts of Rule Block 2 to determine if Rule Block 2's condition has been satisfied with respect to the specific key. In one arrangement, only those fields that were utilized to "group" received and processed facts at a particular RB may be available for selection of a group by field in a linking relationship object. As an example, a user may configure the adjacent RB group by fields by manipulating a drop-down menu on a corresponding cell 708 which may be populated by a list of only available group by fields. In another arrangement, the list for one RB may be populated with all group by fields in the RB which are compatible with a selected field for the adjacent RB. For example, if the selected group by field for the field of one RB is an IP address, then it can only be related to an IP address in the adjacent RB. That is, it would not make sense to try to relate an IP address to a common event because they identify different things.

The user interface 700 may also include a portion 712 that allows a user to specify a particular period of time within which the particular RB must be satisfied. This period of time may also be set or modified via one or more of the user interfaces 600, 600' 600'', 600'''. Another portion 716 allows the user to set or modify an offset of a time window processed by a particular RB relative to a time window of a previous RB (e.g., see previous discussion in relation to FIG.

5). Either or both of the information of portions 712 and 716 may be encapsulated with the above-discussed linking relationship objects.

Figure 21:
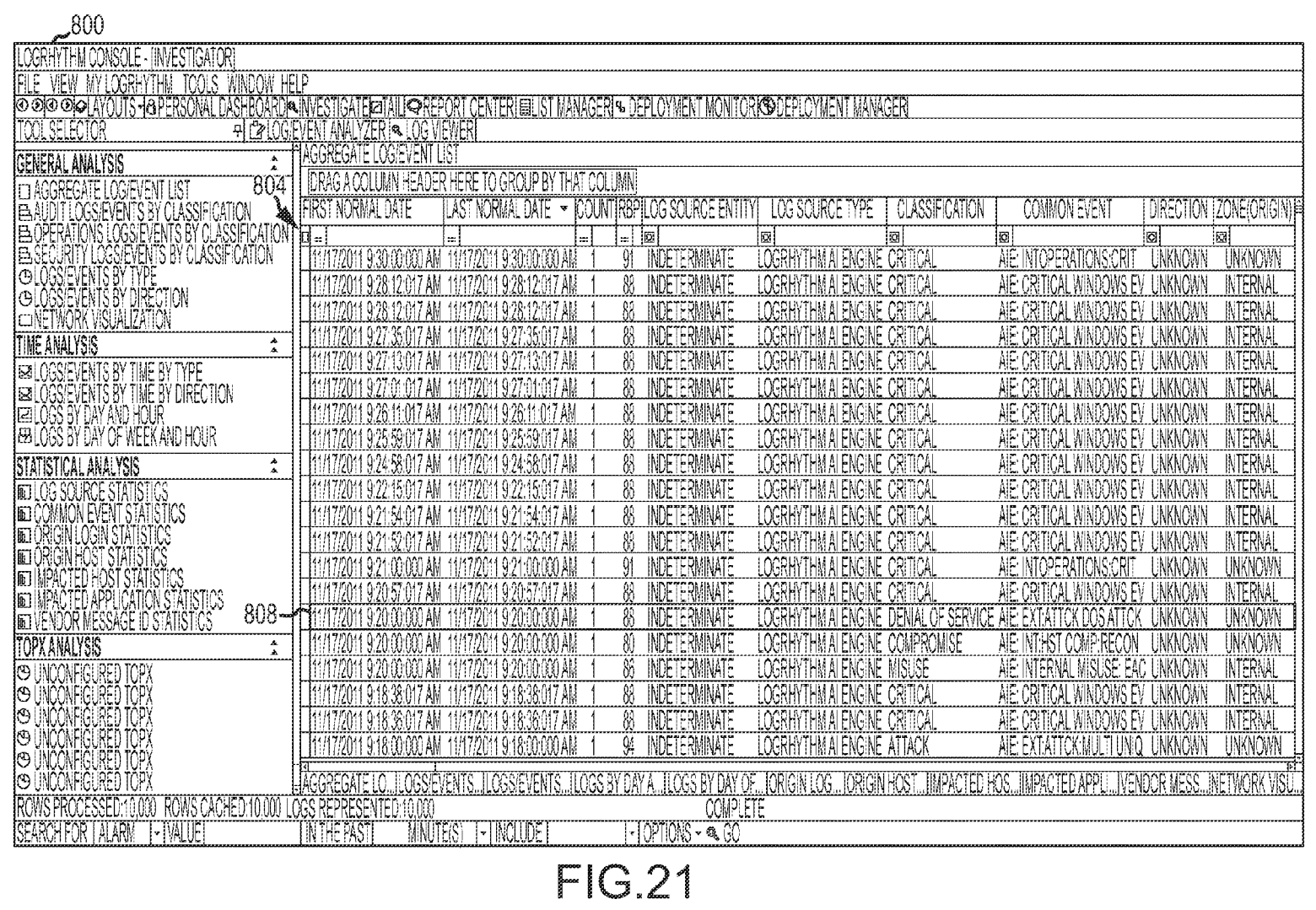
Figure 22:
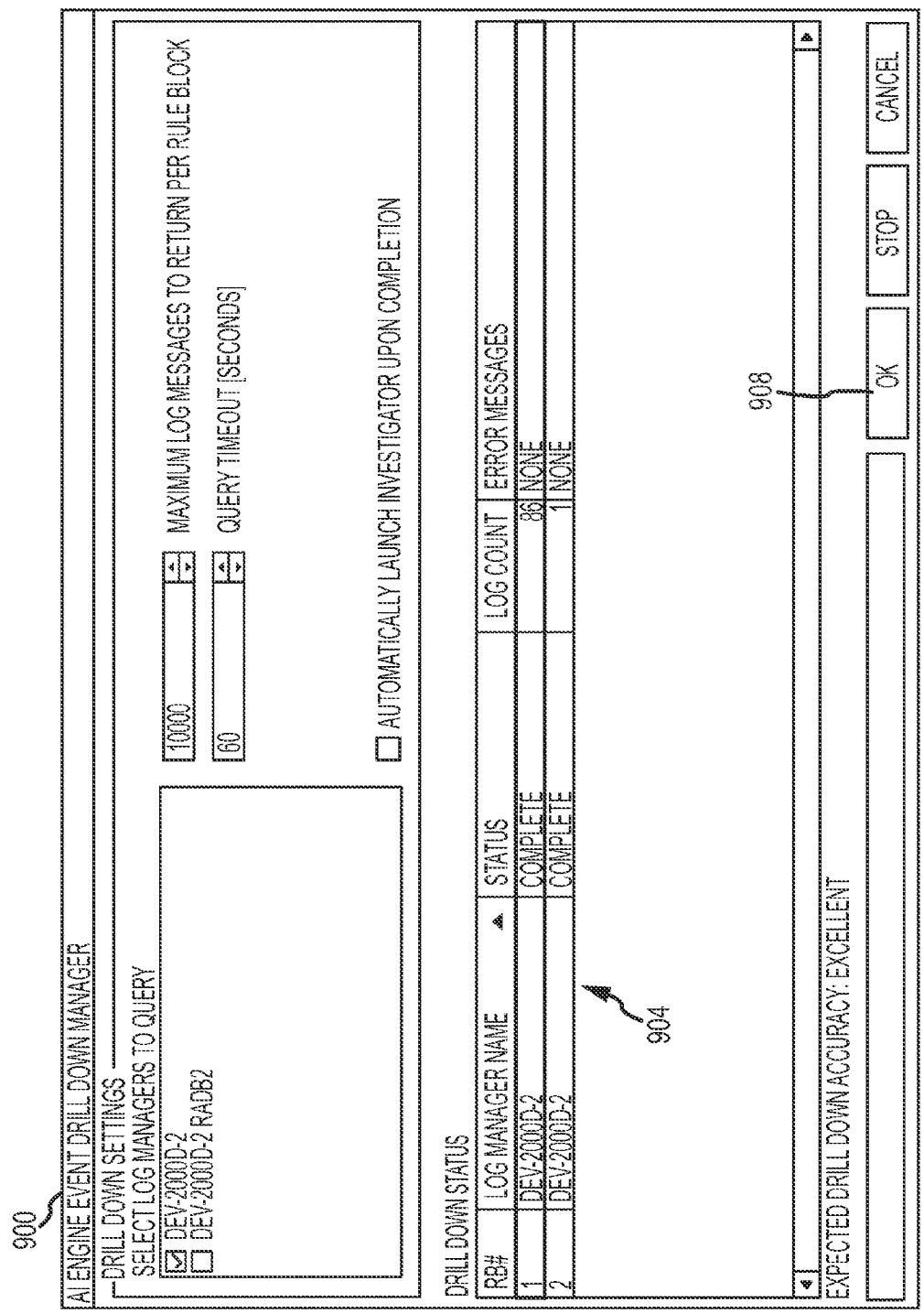

Turning now to FIG. 21, a screenshot of a user interface 800 is presented that allows a user to observe and investigate on a number of "AIE events" (i.e., events generated via AIE processing). For instance, the user interface 800 may include a number of rows and columns of cells 804, where each row represents an event and the cells of each column include metadata (e.g., log source entity, classification, direction, etc.) making up each of the events. To obtain more detailed information regarding a particular event, a user may "drill-down" into or otherwise manipulate an event (e.g., such as event 808) in any appropriate manner. With respect to FIG. 22, a screenshot of a user interface 900 is illustrated (e.g., after a user has drilled down into event 808) that generally shows the number of facts (e.g., logs) that satisfied the conditions of each of the one or more RBs (as shown, RB#1 and RB#2) of the particular AIE rule and that lead to the generation of event 808.

Figure 23:
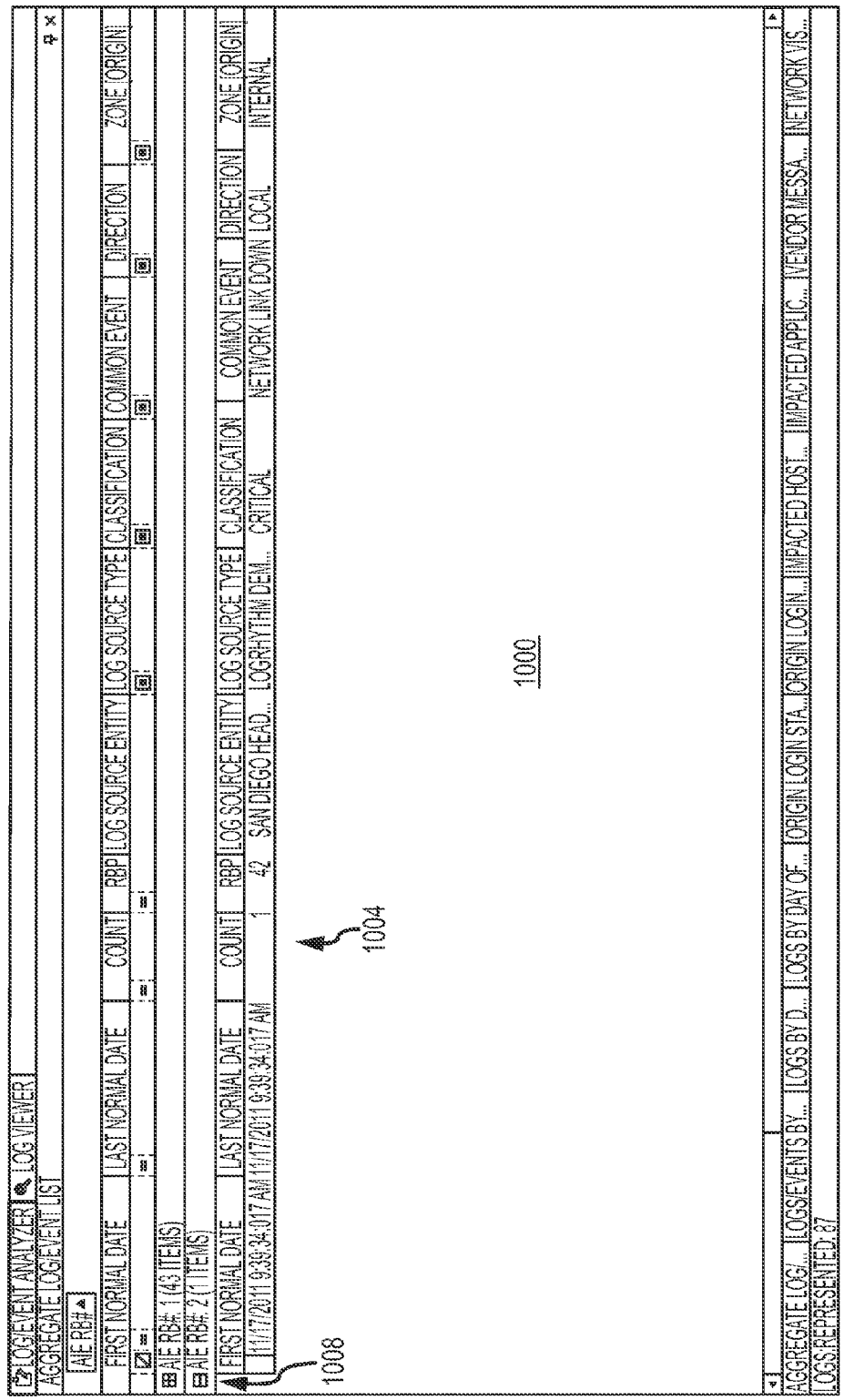

For instance, the user interface 900 may include a number of rows and columns of cells 904, where each row represents an RB and the cells of each column include metadata (e.g., log manager name, status, log count, etc.) regarding each of the RBs. Upon appropriately manipulating the user interface 900 (e.g., clicking "ok" button 908), the user may be presented with a screenshot of another user interface 1000 as illustrated in FIG. 23. As shown, the user interface 1000 generally conveys how the pertinent facts for each RB (i.e., those facts that lead to the satisfaction of the RB's condition as discussed previously) have been grouped together for efficient viewing. For instance, the user interface 1000 may include a number of rows and columns of cells 1004, where each row represents an aggregate fact (e.g., log) and each cell of the columns includes metadata (e.g., log source entity, classification, direction, etc.) making up each aggregate fact. The user interface 1000 may include collapse/expand buttons 1008 for each RB to allow a user to selectively show or hide the various facts that lead to the satisfaction of the condition of each RB. In the illustrated example, the group of 43 aggregate facts for RB#1 has been collapsed while the single fact meeting criteria for RB#2 has been displayed.

Figure 25:
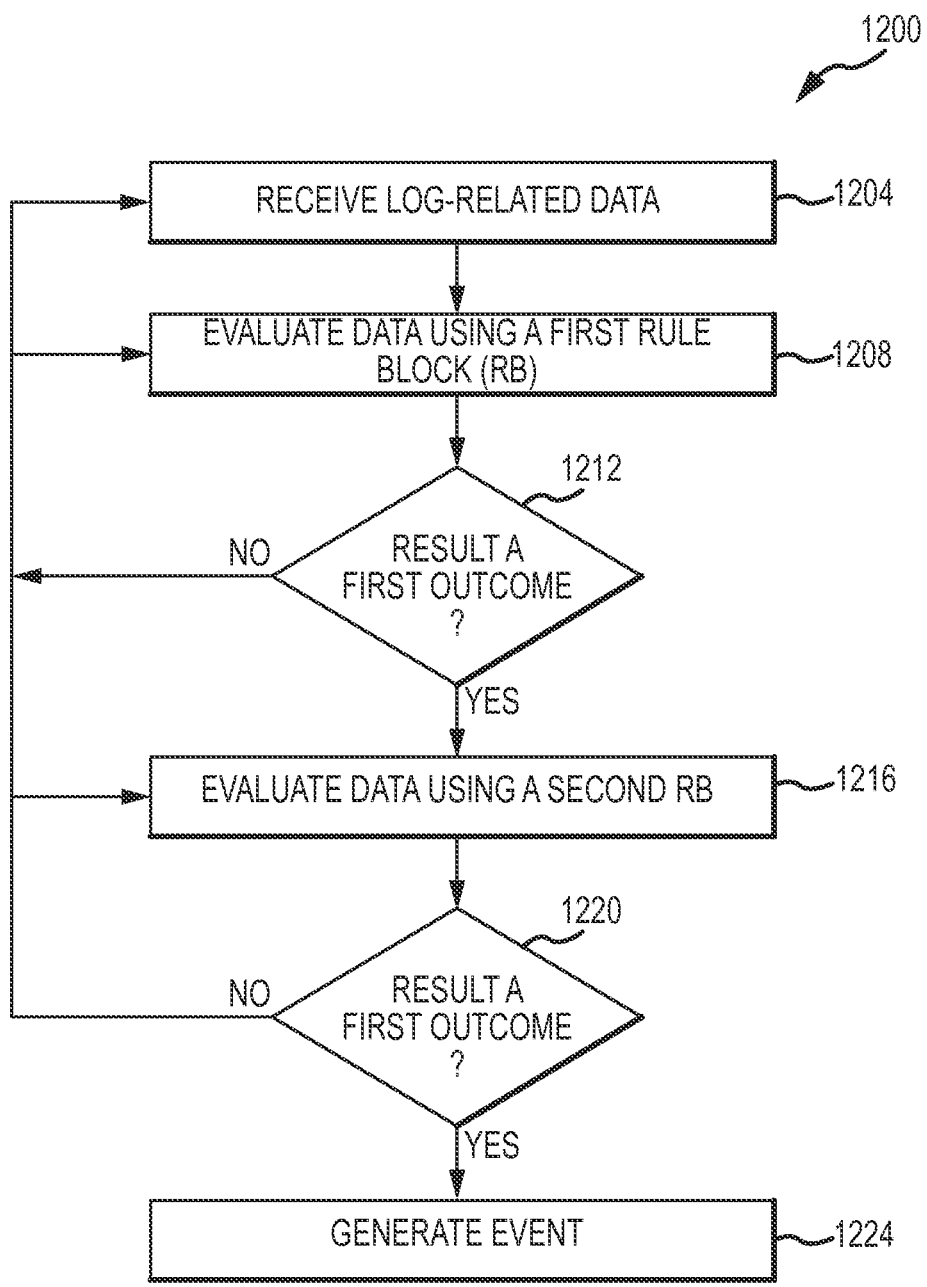
FIG. 25 illustrates a data processing protocol for use with the teachings presented herein.

FIG. 25 presents a flow diagram or protocol 1200 for use in monitoring one or more platforms of one or more data systems (e.g., devices 22 or networks 26 in FIG. 1). The protocol 1200 may include receiving log-related data (e.g., facts 124 in FIG. 2) at a processing engine (e.g., at AIE 100 in FIG. 2) at 1204, and evaluating at least some of the data using a first rule block (e.g., RB$_1$ 108 in FIG. 2) at 1208 to determine whether a result of the evaluation is a first outcome (e.g., an interesting occurrence or development) or a second outcome (e.g., a non-interesting occurrence or development) at 1212. For instance, the first outcome may be that a particular log(s) or quantitative threshold(s) has been observed. In response to the result being the second outcome, the protocol 1200 may flow back to 1204 whereby additional log-related data may be received and/or 1208 where the first RB may again be evaluated.

In response to a determination that the result is the first outcome at 1212, a satisfied condition object may be generated for the first RB and the protocol 1200 may flow to 1216 whereby a second RB (e.g., RB$_2$ 112 in FIG. 2) may be evaluated to determine whether a result of the evaluation is a first (interesting/desired) outcome or a second (non-interesting/non-desired) outcome at 1220. In response to the result being the second outcome, the protocol 1200 may flow back to 1204 whereby additional log-related data may be received, 1208 where the first RB may again be evaluated, or 1216 where the second RB may again be evaluated. In response to a determination that the result is a first outcome at 1220, a satisfied condition object may be generated for the second RB and an event may then be generated at 1224. It should be appreciated that numerous modifications and/or additions to the protocol 1200 are envisioned as well as other protocols for use with or by the teachings presented herein.

It should also be appreciated that the various user interfaces disclosed herein are only presented for exemplary purposes and should not be seen as limiting the present disclosure in any regard. Rather, the user interfaces are only meant to assist the reader in understanding one manner of implementing the teachings disclosed herein on one or more computer systems. Similarly, the various manners of access (e.g., right clicking on a line to bring up a particular drop down menu, and then selecting a particular tab or button, etc.) to the various modules and functionalities (e.g., creating RBs, specifying linking relationship objects) disclosed herein should not be seen as limiting such tools and functionalities to the particular manners of access discussed or even limiting such modules and functionalities to use with any manners of access at all. Rather, these manners of access have only been shown as examples to assist the reader in understanding how one may access such modules on a use interface. Other manners of access to the various modules and functionalities are also envisioned and encompassed within the scope of the various embodiments.

Furthermore, embodiments disclosed herein can be implemented as one or more computer program products, i.e., one or more modules of computer program instructions encoded on a computer-readable medium for execution by, or to control the operation of, data processing apparatus. For example, the various modules and managers utilized by the system 10 of FIG. 1 to process facts, generate events, take remedial action, and the like, may be provided in such computer-readable medium and executed by a processor or the like. The computer-readable medium can be a machine-readable storage device, a machine-readable storage substrate, a memory device, a composition of matter affecting a machine-readable propagated signal, or a combination of one or more of them. The system 10 may encompass one or more apparatuses, devices, and machines for processing data, including by way of example a programmable processor, a computer, or multiple processors or computers. In addition to hardware, the system 10 may include code that creates an execution environment for the computer program in question, e.g., code that constitutes processor firmware, a protocol stack, a database management system, an operating system, or a combination of one or more of them.

A computer program (also known as a program, software, software application, script, or code) used to provide the functionality described herein (such as to provide the various artifact rights management processes disclosed herein) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit). Processors suitable for the execution of a computer program include, by way of example, both general and special purpose microprocessors, and any one or more processors of any kind of digital computer. Generally, a processor will receive instructions and data from a read-only memory or a random access memory or both. Generally, the elements of a computer are a processor for performing instructions and one or more memory devices for storing instructions and data. The techniques described herein may be implemented by a computer system configured to provide the functionality described.

In different embodiments, system 10 (i.e., the one or more log managers 30, AIEs 50, event managers 38, and the like) may include one or more of various types of devices, including, but not limited to a personal computer system, desktop computer, laptop, notebook, or netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Typically, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, a digital camera, to name just a few. Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry. To provide for interaction with a user (e.g., via the user interfaces discussed herein), embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this disclosure contains many specifics, these should not be construed as limitations on the scope of the disclosure or of what may be claimed, but rather as descriptions of features specific to particular embodiments of the disclosure. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Additionally, the foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A method for use in monitoring one or more platforms of one or more data systems, comprising:
   receiving, at a processor, structured data generated by one or more platforms over at least one communications network;
   first evaluating, by the processor engine using one of first and second rule blocks, at least some of the data;
   first determining that a result of the first evaluating is a first of at least first and second outcomes, wherein the at least some of the data leading to the first outcome is identified by a time stamp that corresponds to a first time;
   accessing, by the processor, a linking relationship object contained within at least one of the first and second rule blocks to determine a specified time period relative to the first time;
   second evaluating, by the processor using the other of the first and second rule blocks, at least some of the data associated with one or more time stamps corresponding to a second time within the specified time period relative to the first time;
   second determining, from the second evaluating, whether a result is one of at least first and second outcomes; and
   analyzing the results of the first and second determining steps to determine an event of interest.

2. The method of claim 1, wherein the specified relationship comprises the one or more second times occurring before the first time.

3. The method of claim 1, wherein the specified relationship comprises the one or more second times occurring at the same time as or after the first time.

4. The method of claim 1, wherein the first evaluating uses the second rule block and the second evaluating uses the first rule block.

5. The method of claim 1, wherein the first evaluating uses the first rule block and the second evaluating uses the second rule block.

6. The method of claim 1, wherein the second determining comprises second determining that the result is the first outcome, and wherein the method further comprises:
generating an event in response to the second determining comprising the first outcome.

7. The method of claim 1, wherein the second determining comprises second determining that the result is the second outcome, and wherein the method further comprises after the second determining:
third evaluating, by the processor using the other of the first and second rule blocks, at least some of the data;
third determining that a result of the third evaluating is a first of at least first and second outcomes, wherein the at least some of the data leading to the first outcome is identified by a time stamp that corresponds to a third time;
fourth evaluating, by the processor using the one of the first and second rule block, at least some of the data associated with the time stamp corresponding to the first time having a specified relationship to the third time;
fourth determining, from the fourth evaluating, whether a result is one of at least first and second outcomes, wherein the results are analyzed to determine an event of interest.

8. The method of claim 7, wherein the fourth determining comprises fourth determining that the result is the first outcome, and wherein the method further comprises:
generating an event in response to the fourth determining comprising the first outcome.

9. The method of claim 1, wherein the first evaluating comprises making a determination about a content of one or more fields of the at least some of the data, wherein the second evaluating comprises making a determination about a content of one or more fields of the at least some of the data, and wherein a content of one of the fields in the first evaluating matches a content of one of the fields in the second evaluating.

10. The method of claim 9, wherein the second evaluating comprises:
utilizing the matching content as a key into an index structure of the at least some of the data to determine if the result is one of the first and second outcomes.

11. A system for use in monitoring one or more platforms of one or more data systems, comprising:
a processor,
a memory connected to the processor and comprising a set of computer readable instructions that are executable by the processor to:
receive structured data generated by one or more platforms over at least one communications network;
evaluate at least some of the received data with a first rule block to obtain a first result;
determine that the first result is a first of at least first and second outcomes,
wherein the at least some of the received data leading to the first outcome is identified by a time stamp that corresponds to a first time;
access a linking relationship object to determine a specified time period relative to the first time;
evaluate, with a second rule block, at least some of the received data associated with one or more time stamps that correspond to one or more second times within the specified time period relative to the first time to obtain a second result;
determine that the second result is one of at least first and second outcomes; and
analyze the results to determine an event interest.

12. The system of claim 11, wherein the specified relationship comprises the one or more second times occurring before the first time.

13. The system of claim 11, wherein the specified relationship comprises the one or more second times occurring at the same time as or after the first time.

14. The system of claim 11, wherein the set of computer readable instructions determines that the second result is the first outcome, and wherein the
set of computer readable instructions is executable by the processor to generate an event in response to the second rule block determining that the second result is the first outcome.

15. The system of claim 11, wherein the set of computer readable instructions determines that the second result is the second outcome; and wherein the set of computer readable instructions is executable by the processor to:
evaluate at least some of the data to obtain a third result; and
determine that the third result is a first of at least first and second outcomes, wherein the at least some of the data leading to the first outcome is identified by a time stamp that corresponds to a third time;
evaluate at least some of the data associated with the time stamp corresponding to the first time having a specified relationship to the third time to obtain a fourth result; and
determine whether the fourth result is one of at least first and second outcomes, wherein the results are analyzed to determine an event of interest.

16. The system of claim 15, wherein the set of computer readable instructions determines that the fourth result is the first outcome, and wherein the set of computer readable instructions is executable by processor to generate an event in response to the first rule block determining that the fourth result is the first outcome.

17. The system of claim 11, wherein the set of computer readable instructions evaluates the at least some of the data by making a determination about a content of one or more fields of the at least some of the data, wherein the set of computer readable instructions evaluates by making a determination about a content of one or more fields of the at least some of the data, and wherein a content of one of the fields evaluated by the first rule module matches a content of one the fields evaluated by the second rule module.

18. The system of claim 17, wherein the set of computer readable instructions evaluates by utilizing the matching content as a key into an index structure of the at least some of the data to determine if the second result is one of the first and second outcomes.

19. A method for use in monitoring one or more platforms of one or more data systems, comprising:
receiving, at a processor, structured data generated by one or more platforms over at least one communications network;
first evaluating, by the processor using one of first and second rule blocks, at least some of the data;
first determining that a result of the first evaluating is a first of at least first and second outcomes, wherein the at least some of the data leading to the first outcome is identified by a time stamp that corresponds to a first time;
second evaluating, by the processor using the other of the first and second rule blocks, at least some of the data associated with a second time stamp corresponding to a second time;

second determining, from the second evaluating, whether a result is one of at least first and second outcomes;

receiving, by an event manager, results of the first and second evaluating;

accessing, by the event manager, a linking relationship object that associates the first and second rule blocks to determine a specified time period;

ascertaining, by the event manager, whether the first and second times are within the specified time period; and generating, by the event manager, an event in response to the ascertaining step.

\* \* \* \* \*

UNITED STATES PATENT AND TRADEMARK OFFICE
CERTIFICATE OF CORRECTION

PATENT NO. : 9,576,243 B2  
APPLICATION NO. : 14/026834  
DATED : February 21, 2017  
INVENTOR(S) : Petersen et al.

Page 1 of 1

It is certified that error appears in the above-identified patent and that said Letters Patent is hereby corrected as shown below:

In the Claims

Column 36, Line 36, delete "engine"

Signed and Sealed this
Eleventh Day of April, 2017

Michelle K. Lee
*Director of the United States Patent and Trademark Office*